US012542023B2

(12) United States Patent
Colecchia et al.

(10) Patent No.: US 12,542,023 B2
(45) Date of Patent: Feb. 3, 2026

(54) METHOD AND SYSTEM FOR STORING FLEXIBLE DOCUMENTS

(71) Applicant: ARCA TECHNOLOGIES S.R.L., Bollengo (IT)

(72) Inventors: Enrico Colecchia, Bollengo (IT); Paolo Martinotti, Bollengo (IT)

(73) Assignee: SESAMI TECHNOLOGIES S.R.L., Bollengo (IT)

( * ) Notice: Subject to any disclaimer, the term of this patent is extended or adjusted under 35 U.S.C. 154(b) by 0 days.

(21) Appl. No.: 18/213,041

(22) Filed: Feb. 26, 2024

(65) Prior Publication Data

US 2023/0419764 A1 Dec. 28, 2023

(51) Int. Cl.
*G07D 11/235* (2019.01)
*G07D 11/13* (2019.01)

(52) U.S. Cl.
CPC .......... *G07D 11/235* (2019.01); *G07D 11/13* (2019.01); *G07D 2211/00* (2013.01)

(58) Field of Classification Search
CPC .. G07D 11/235; G07D 11/13; G07D 2211/00; B65H 43/00; B65H 2301/4191;
(Continued)

(56) References Cited

U.S. PATENT DOCUMENTS

2010/0052237 A1* 3/2010 Herczeg .................. G07F 19/20
271/3.16
2010/0100245 A1* 4/2010 Oishi .................. B65H 29/006
700/275

* cited by examiner

*Primary Examiner* — Matthew Mikels
(74) *Attorney, Agent, or Firm* — Williams Mullen; R. Brian Drozd

(57) ABSTRACT

Method (1) for storing a series of flexible documents in a system, the system comprising one storing and issuing module, one conveyor belt, configured for supporting and transporting the flexible documents toward the at least one storing and issuing module at known conveying speed $v_c(t)$, one sensor group, configured to sense any flexible document B(m) transported on the conveyor belt and provide corresponding sensing information, and a central processing unit, operatively connected to the sensor group and the at least one storing and issuing module. The method (1) includes, for an $m^{th}$ flexible document B(m) of the series, the steps of: (1.1) sensing, through sensor group, sensing information regarding flexible document B(m), (1.2) providing within a known prediction time instant $t_p(m)$ from sensing, the sensing information to processor; (1.3) determining, through the processor: based on the received sensing information and conveying speed $v_c(t)$ of conveyor belt, a subsequent joint time instant $t_j(m)$, wherein the rear end of the flexible document B(m) will have entered the storing and issuing module and will be engaged by the holding means with the transport tape, based on a diameter of an assembly formed by storage roller and transport tape rolled together with any previously engaged flexible document around the storage roller, an acceleration value ($a_t$), and based on the acceleration value ($a_t$), a deceleration value ($dec_t$); (1.4) calculating a pattern of linear speed $v_{t(m)}(t)$ at which transport tape must be moved by storage roller, and (1.5) controlling actuation of the holding means at $t_j(m)$ and, based on the pattern of linear speed $v_{t(m)}(t)$, one or more respective control signal to the motor, causing control of the storage roller rotation, and a movement of the transport tape according to the calculated speed pattern $v_{t(m)}(t)$.

17 Claims, 14 Drawing Sheets

(58) Field of Classification Search
CPC ...... B65H 2511/13–14; B65H 2511/30; B65H 2513/10; B65H 2513/20; B65H 2513/23; B65H 2557/242; B65H 29/006; B65H 2701/1912
See application file for complete search history.

$$I_{tot60} = I_{60} + \left(\frac{Z_{60}}{Z_{50}}\right)^2 * I_{50} + \left(\frac{Z_{60}}{Z_{50}} * \frac{Ø_{50+52}}{Ø_{50'+52}}\right)^2 * I_{50'} + \left(\frac{Z_{60}}{Z_{50}} * \frac{Ø_{50+52}}{Ø_{50'+52}} * \frac{Z_{50'}}{Z_{60'}}\right)^2 * I_{60'}$$

*

=

Compensation-space(A) as area of rectangle-trapezoid

Trapezius-area is : $A = (B+b) * h / 2$ and the height is also : $h = a_t * (B-b)$ replacing h we have : $A = (B+b) * (B-b) * a_t / 2$ or also : $A = (B^2-b^2) * a_t / 2$ knowing A, B and $a_t$ we obtain : $b = \sqrt{\frac{\left(B^2 * \frac{a_t}{2}\right) - A}{\frac{a_t}{2}}}$ and then h and $v_t$.

Compensation-space(A) as area of rectangle-trapezoid

| | |
|---|---|
| Trapezius-area is : | $A = (B+b) * h / 2$ |
| and the height is also : | $h = a_t * (B-b)$ |
| replacing h we have : | $A = (B+b) * (B-b) * a_t /2$ |
| or also : | $A = (B^2-b^2) * a_t /2$ |
| knowing A, B and $a_t$ we obtain : | $b = \sqrt{\frac{\left(B^2 * \frac{a_t}{2}\right) - A}{\frac{a_t}{2}}}$ |
| and then h and $v_t$. | |

METHOD AND SYSTEM FOR STORING FLEXIBLE DOCUMENTS

RELATED APPLICATION

This application claims priority to Italian Patent Application No. 102022000013522 filed Jun. 27, 2022, the disclosure of which is incorporated by reference in its entirety.

FIELD OF THE INVENTION

The present invention relates to a method and system for storing flexible documents in a storing and issuing module, the storing and issuing module being configured to store and issue flexible documents such as banknotes and paper documents, and to be used in a flexible document receiving and dispensing device allowing in a simple, reliable, and effective way handling larger storage capacity than traditional equipment without increasing power consumption.

In the following, reference will be mainly made to banknotes as flexible documents. However, it should be noted that the method and system according to the invention may be used to store and issue any other type of flexible documents, including paper documents such as checks, notes, certificates, and licenses, still remaining within the scope of protection of the present invention defined by the attached claims.

BACKGROUND OF THE INVENTION

Equipment for automatic deposit and withdrawal of banknotes, for example as disclosed in EP3349193, are used not only in banking sites but also in retail sites, as help for tellers or as customer-operated machines.

This kind of equipment includes banknote receiving and dispensing devices, optionally having function of recycling, each one comprising one or more storing and issuing modules which can be removably mounted within a respective housing, wherein each module is configured to store a given banknote denomination, also depending on the size thereof.

The number of employed modules determines denominations and/or types of banknotes to be handled, as well as dimensions and cost of the equipment.

In fact, in use, the different denominations or types of banknotes are associated to a very different number of storing and issuing operations. For example, a module receiving denominations of banknotes of greater circulation, such as 20 euros and 50 euros banknotes, normally needs to satisfy high request of storing and issuing operations, often varying over time, and it can easily become full or empty thereby limiting functionality of the whole device. To compensate for this drawback, the addition of modules for storing and issuing banknotes with greater circulation in an equipment for automatic deposit and withdrawal of banknotes could be considered. However, this would result in high costs and is not efficient for storage room dimensioning.

A prior art device for storing and issuing single denomination banknotes is disclosed in document EP2104638. As schematically shown in FIG. 1, such prior art storing and issuing module includes, among other elements, a storage roller 50 operatively associated with a motor (not shown) and at least one transport tape 52 configured to be rolled on the storage roller 50 together with banknotes, when the associated motor is activated. Before entering the storing and issuing module, through a respective opening 20 thereof, the banknotes are transported on a conveyor belt (not shown) and are deviated therefrom by at least one diverter 42 comprised in the storing and issuing module and controlled by at least one respective electromagnet. The diverter 42 is arranged at opening 20, which is formed in one side of the storing and issuing module facing the conveyor belt, and in proximity of an input transport roller 31; the banknotes are thus conveyed in a linear conveying section 51 extending from the opening 20 to the outer diameter of the storage roller 50. Through such conveying section 51 each banknote entering the storage and issuing device is guided along one banknote channel (delimited by bottom and top lever arms 75 and 76) to the outer diameter of the storage roller 50. In FIG. 1, two cases are represented, namely:

- a first case where the module has not received any banknote yet, and the diameter of the assembly formed by the storage roller 50 and the transport tape 52 is substantially equal to the diameter of the storage roller 50, and
- a second case, wherein the module has already received a certain number of banknotes, and the diameter of the assembly formed by the storage roller 50, the transport tape 52 and the banknotes substantially corresponds to the diameter of storage roller 50, plus the thickness of the transport tape 52 rolled up with the banknotes around storage roller 50.

At conveying section 51 the storing and issuing module is provided with photoelectric sensors 66 configured for detecting the presence of banknotes in respective areas of detection of the conveying section 51 and sending a corresponding activation signal(s) causing activation of the motor associated to storage roller 50. The storing and issuing module is also provided with an electronic unit 80 and holding means, such as pairs of pinch-rollers (not represented in FIG. 1) which can be actuated for engaging the banknotes to be stored with transport tape 52, in response to a suitable control signal imparted by an electronic unit 80 of the storage and issuing module, when the photoelectric sensors 66 have sensed one banknote on the conveying section 51.

The maximum distance in the conveying section 51 between the opening 20 and the holding means and the distance between the holding means and the outer diameter of the storage roller 50 must be smaller than the smallest size of the denominations to be stored on or issued from the storage roller 50, for instance such distance must be lower than 62 millimeters for five euros (€ 5) banknotes.

The electronic unit 80 of the storing and issuing module of the prior art is programmed for controlling the holding means and the motor of the storage roller 50 based on the physical parameters of the device, the length of the banknote and in response to signals from the photoelectric sensors, so as to store the banknotes on the storage roller with void space queuing providing substantial contact between the input edge of an entering banknote and the output edge of a last stored banknote.

Such prior art storing and issuing module has a great reliability. Nevertheless, it has a limited storage capacity up to 600 banknotes, since storing a larger number of banknotes would entail an increased length of a transport tape 52 wrapped together with the banknotes around its storage roller 50, and the provision of a longer transport tape 52 would pose many issues regarding design configuration of the storing and issuing module itself, among which the fact that an increased length of the transport tape 52 wrapped together with the banknotes around the storage roller 50 would result in a greater diameter of the assembly formed by transport tape-banknotes-storage roller and a consequent greater inertia thereof, with higher power consumption requested for its rotation.

It is therefore an object of this invention to allow in a simple, reliable, and effective way maximizing storage capacity of flexible documents, such as banknote, to be stored on and issued from a storing and issuing module, with no increase in its power consumption.

SUMMARY OF THE INVENTION

It is specific subject matter of the present invention a method for storing a series of flexible documents in a system, the system comprising at least one storing and issuing module, one conveyor belt, configured for supporting and transporting in said system said flexible documents toward said at least one storing and issuing module at known conveying speed $v_c(t)$, one sensor group, arranged with respect to said conveyor belt in such a way that it can sense any flexible document B(m) transported on said conveyor belt and provide corresponding sensing information, and a central processing unit, operatively connected to said sensor group and said at least one storing and issuing module and configured to receive and process said sensing information, and send corresponding control signals to said at least one storing and issuing module;

wherein in said at least one the storing and issuing module one opening is formed, through which each flexible document B(m) can enter the same with its front end, and be transported through a linear conveying section of the storing and issuing module, the storing and issuing module having at least:

a storage roller actuated by a motor;

one transport tape configured to be dragged in rotation by the storage roller around the same;

holding means, arranged at said conveying section, and configured for engaging each flexible document B(m) with the transport tape, when the rear end of the flexible document B(m) has entered the storing and issuing module through opening, the engagement occurring along a linear path of transport tape where transport tape can be moved at linear speed before being rolled on storage roller;

one processor, operatively connected, through said central processing unit, to at least said sensor group, and also operatively connected to said storage roller, motor, and holding means;

said method comprising, for an $m^{th}$ flexible document B(m) of the series, the steps of:

1.1 sensing, through said sensor group, sensing information regarding said flexible document B(m), 1.2 providing within a known prediction time instant $t_p(m)$ from sensing, through said central processing unit, said sensing information to processor; and 1.3 determining, through said processor:

based on said received sensing information and said known conveying speed $v_c(t)$ of conveyor belt, a subsequent joint time instant $t_j(m)$, wherein the rear end of said flexible document B(m) will have entered the storing and issuing module and will be engaged by said holding means with said transport tape, based on a diameter of an assembly formed by said storage roller and said transport tape rolled together with any previously engaged flexible document around said storage roller, an acceleration value, and based on said acceleration value, a deceleration value;

1.4 calculating a pattern of linear speed $v_{t(m)}(t)$ at which said transport tape must be moved by said storage roller, after prediction time instant $t_p(m)$ such that, at estimated joint time instant $t_j(m)$, when said holding means engage said flexible document B(m) with transport tape in said at least one storing and issuing module, a predetermined desired distance $d_d$ on said transport tape is left between said front end of said flexible document B(m) and a rear end of a flexible document B(m−1) of the series, last engaged by said transport tape, if any, based on:

the sensing information;

said determined joint time instant $t_j(m)$, acceleration and deceleration values; and a linear speed profile $v_{t(m-1)}(t)$ determined by processor said for the previous flexible document B(m−1) of the series, if any; and 1.5 sending, by said processor, control signals causing actuation of said holding means at $t_j(m)$ and, based on said pattern of linear speed $v_{t(m)}(t)$ of said transport tape, one or more respective control signal to said motor, causing control of said storage roller rotation, and a corresponding movement of said transport tape according to the calculated speed pattern $v_{t(m)}(t)$.

According to another aspect of the invention, said acceleration value can be inversely proportional to a total Inertia required to rotate, through said motor, said assembly formed by said storage roller and said transport tape rolled together with any previously engaged flexible document around said storage roller.

According to a further aspect of the invention, said total Inertia can be a function of said diameter value of said assembly formed by said storage roller and said transport tape rolled together with any previously engaged flexible document around said storage roller, optionally wherein said acceleration value can be calculated in real-time or it can be calculated off-line and stored in said processor, optionally in a lookup table, as a function of said diameter value.

According to an additional aspect of the invention, said sensing information can comprise at least the dimensions of a sensed $m^{th}$ flexible document B(m) of the series of flexible documents and its angular position with reference to an axis parallel to a longitudinal symmetry axis of conveyor belt, and optionally the distance of each flexible document from a lateral edge of conveyor belt, and/or a denomination of said sensed $m^{th}$ flexible document B(m), more optionally a length of the projection of the sensed $m^{th}$ flexible document B(m) along an axis parallel to the longitudinal symmetry axis of conveyor belt.

According to another aspect of the invention, if the $m^{th}$ flexible document B(m) is the very first one of the series of flexible documents or if it is not the first one and prediction time instant $t_p(m)t \geq (t_j(m-1)+\Delta t_{stop})$, where:

$t_j(m-1)$ is the joint time instant of the last engaged flexible document B(m−1) of the series, and $\Delta t_{stop}$ is a known time interval required to take a flexible document to a resting or stop position on transport tape with its rear end at a stop distance $d_s$ from opening, then said pattern of linear speed $v_{t(m)}(t)$ of transport tape can be calculated, so that, between $t_p(m)$ and $t_j(m)$, it satisfies rule:

$$\int_{tp(m)}^{tj(m)} v_{t(m)}(t)dt = \mathrm{Proj}(m) + d_d - d_s$$

where Proj(m) is the length of the projection of the sensed flexible document B(m) along an axis parallel to the longitudinal symmetry axis of conveyor belt, and after $t_j(m)$, it satisfies rule:

$$\int_{tj(m)}^{tj(m)+\Delta tstop} v_{t(m)}(t)dt = d_s$$

According to a further aspect of the invention, if prediction time instant for said flexible document B(m) is such that $t_p(m) \le t_j(m-1)$, where $t_j(m-1)$ is the joint time instant of the last sensed flexible document B(m−1) of the series, then said pattern of linear speed $v_{t(m)}(t)$ of transport tape is calculated that, between $t_j(m-1)$ and $t_j(m)$, it satisfies rule:

$$\int_{tj(m-1)}^{tj(m)} v_{t(m)}(t)dt = \mathrm{Proj}(m) + d_d$$

where Proj(m) is the length of the projection of the sensed flexible document B(m) along an axis parallel to the longitudinal symmetry axis of conveyor belt, and after $t_j(m)$, the pattern of linear speed $v_{t(m)}(t)$ can be set by processor to satisfy rule:

$$\int_{tj(m)}^{tj(m)+\Delta tstop} v_{t(m)}(t)dt = d_s$$

where $\Delta t_{stop}$ is a known time interval required to take a flexible document B(m) to a resting or stop position on transport tape with its rear end at a stop distance $d_s$ from opening.

According to an additional aspect of the invention, if prediction time instant for said flexible document B(m) is such that $t_j(m-1) < t_p(m) \le (t_j(m-1) + \Delta t_{stop}) - t_{rate}$, where:

- $t_j(m-1)$ is the joint time instant of the last engaged flexible document B(m−1) of the series,
- $\Delta t_{stop}$ is a known time interval required to take a flexible document to a resting or stop position on transport tape with its rear end at a stop distance ds from opening and
- $t_{rate}$ is a constant nominal time interval of said flexile document B(m), then linear speed $v_{t(m)}(t)$ of transport tape can be calculated that, between $t_j(m-1)$ and $t_j(m)$, satisfies rule $$\int_{tj(m-1)}^{tp(m)} v_{t(m-1)}(t)dt + \int_{tp(m)}^{tj(m)} v_{t(m)}(t)dt = \mathrm{Proj}(m) + d_d$$

where Proj(m) is the length of the projection of the sensed flexible document B(m) along an axis parallel to the longitudinal symmetry axis of conveyor belt, and after $t_j(m)$, it satisfies rule:

$$\int_{tj(m)}^{tj(m)+\Delta tstop} v_{t(m)}(t)dt = d_s$$

According to another aspect of the invention, if prediction time instant for said flexible document B(m) is such that $(t_j(m-1) + \Delta t_{stop}) - t_{rate} < t_p(m) < (t_j(m-1) + \Delta t_{stop})$ Where:

- $t_j(m-1)$ is the joint time instant of the last engaged flexible document B(m−1) of the series,
- $\Delta t_{stop}$ is a known time interval required to take a flexible document to a resting or stop position on transport tape with its rear end at a stop distance $d_s$ from opening, and
- $t_{rate}$ is a constant nominal time interval of said flexile document B(m), then the linear speed $v_{t(m)}(t)$ of transport tape can be calculated that, after stop of last engaged banknote B(m−1), it satisfies rule:

$$\int_{tj(m-1)+\Delta t_{stop}}^{tj(m)} v_{t(m)}(t)dt = \mathrm{Proj}(m) + d_d - d_s$$

where Proj(m) is the length of the projection of the sensed flexible document B(m) along an axis parallel to the longitudinal symmetry axis of conveyor belt, and after $t_j(m)$, it satisfies rule:

$$\int_{tj(m)}^{tj(m)+\Delta tstop} v_{t(m)}(t)dt = d_s$$

According to a further aspect of the invention, said stop distance $d_s$ can be comprised between 70% and 100% of the height H of the smallest flexible document to be stored in said at least one storing and issuing module.

According to an additional aspect of the invention, said linear speed $v_{t(m)}(t)$ of transport tape can have a pattern over time defining a line segment or chain of line segments.

According to another aspect of the invention, said line segment or chain of line segments can be associated to: said acceleration value; a constant speed target value ($v_t$); and said deceleration value.

According to a further aspect of the invention, said constant speed target value can be a function of:

- two following joint time instants ($t_j(m-1)$ and $t_j(m)$) determined by processor (80),
- the distance, calculated by processor that the rear end of a last sensed flexible document B(m−1) needs to cover with transport tape in order to allow the entering flexible document B(m), when also engaged by transport tape, to have its front end at distance $d_d$ from rear end of last engaged flexible document B(m−1),
- the acceleration value,
- the value of linear speed $v_{t(m-1)}(t_j(m))$ of the last sensed flexible document B(m−1) that transport tape would have at joint time instant $t_j(m)$, if the flexible document B(m) had not been sensed by sensor group.

It is also a specific subject matter of the present invention a system for storing a series of flexible documents, wherein each flexible document of the series of flexible documents has a front and rear end, said system comprising

- at least one storing and issuing module,
- one conveyor belt, configured for supporting and transporting in said system said flexible documents toward said at least one storing and issuing module at known conveying speed $v_c(t)$,
- one sensor group, arranged with respect to said conveyor belt in such a way that it can sense any flexible document B(m) transported on said conveyor belt and provide corresponding sensing information, and
- a central processing unit, operatively connected to said sensor group and said at least one storing and issuing module and configured to receive and process said sensing information coming, and send corresponding control signals to said at least one storing and issuing module;

wherein in said at least one the storing and issuing module one opening is formed, through which each flexible document B(m) can enter the same with its front end, and be transported through a linear conveying section of the storing and issuing module, the storing and issuing module having at least:

- a storage roller configured to be actuated by a motor;
- one transport tape configured to be dragged in rotation by the storage roller around the same;
- holding means, arranged at said conveying section, and configured for engaging each flexible document B(m) with the transport tape, when the rear end of the flexible document B(m) has entered the storing and issuing module through opening, the engagement occurring along a linear path of transport tape where transport tape can be moved at linear speed before being rolled on storage roller;

one processor, operatively connected through said central processing unit, to at least said sensor group, and also operatively connected to said storage roller, motor, and holding means;

said system being configured to execute the method as disclosed above.

According to another aspect of the invention, when the system comprises more than one storing and issuing module, the central processing unit operatively connected to each processor of each storing and issuing module, and the central processing unit can be further configured to carry out a check of the sensing information and, based on the sensing information, select one of the storing and issuing module and send the sensing information thereto.

BRIEF DESCRIPTION OF THE DRAWINGS

The present invention will be now described, by way of illustration and not by way of limitation, according to its preferred embodiments, with particular reference to the attached Figures, wherein.

In the Figures identical reference numerals will be used for alike elements.

DETAILED DESCRIPTION OF THE PREFERRED EMBODIMENTS

Figure 1:
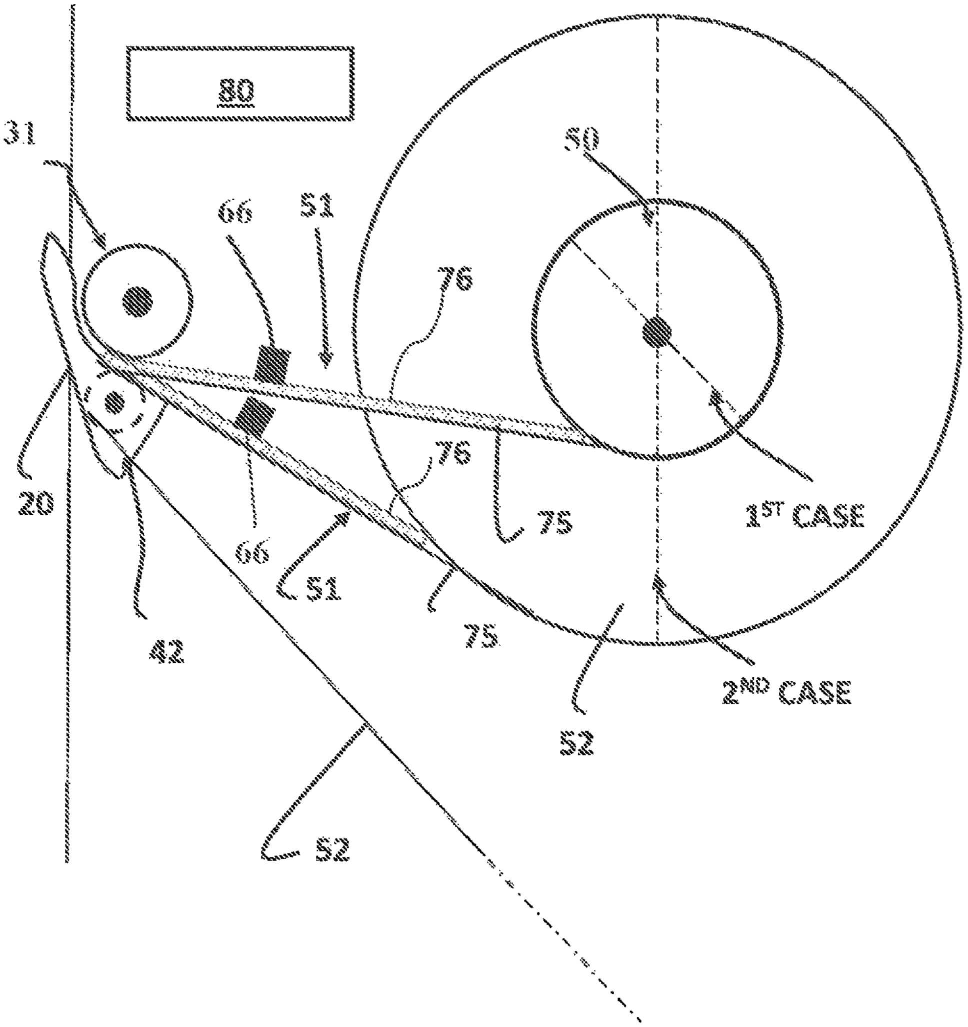
Fig. 1 (PRIOR ART)
FIG. 1 shows a schematic lateral view of the main elements of a storing and issuing module according to the prior art.
Figure 2:
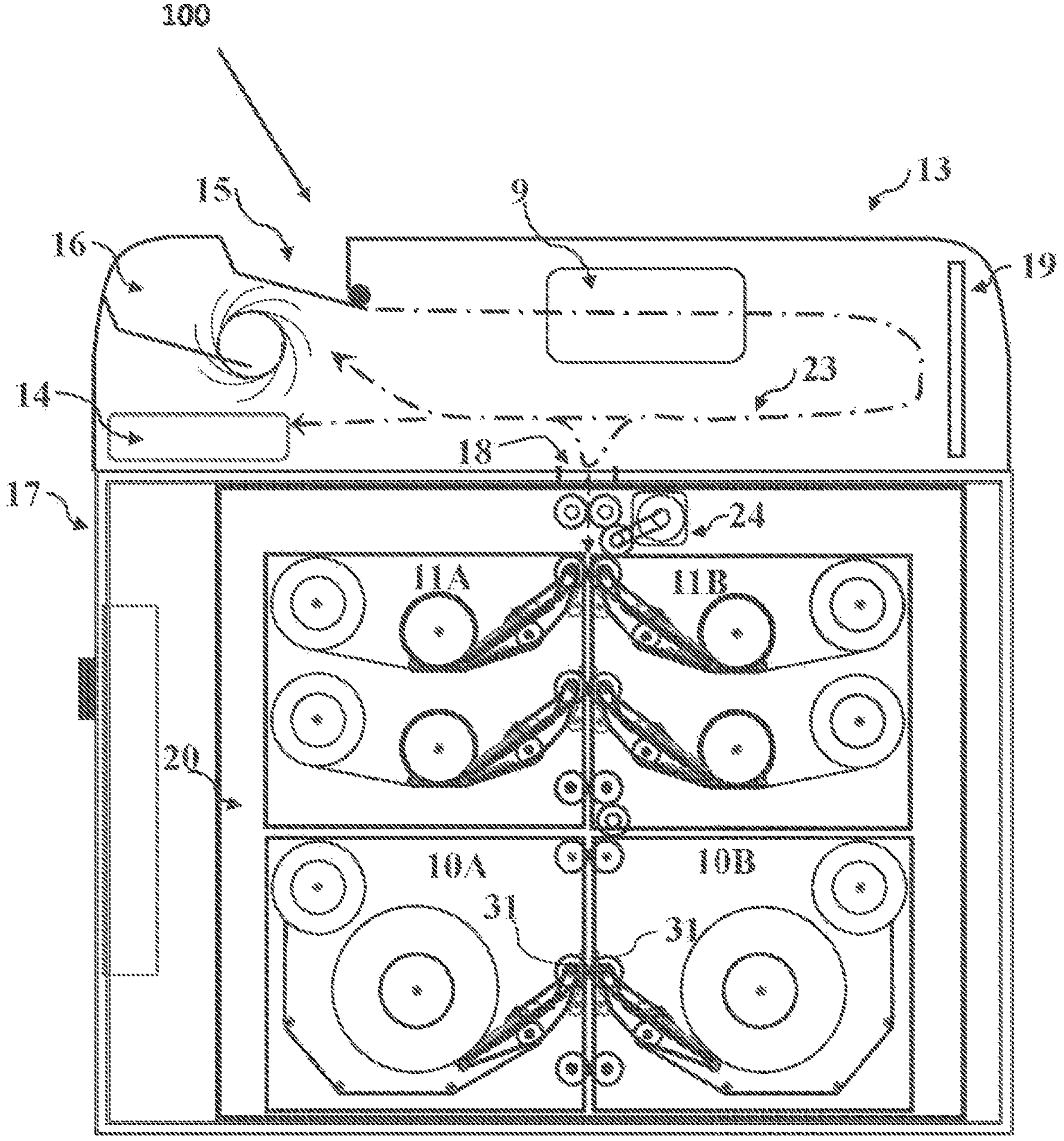
FIG. 2 is a representation of one exemplary embodiment of a flexible document receiving and dispensing device comprising a system 100 according to the invention, including prior art storing and issuing modules as those represented in FIG. 1 (reference numbers 11A, 11B) and other modules (10A and 10B) as disclosed in patent application IT102021000033155 by the same Applicant the disclosure of which is incorporated by reference in its entirety.
Figures 3, 3A, 3B:
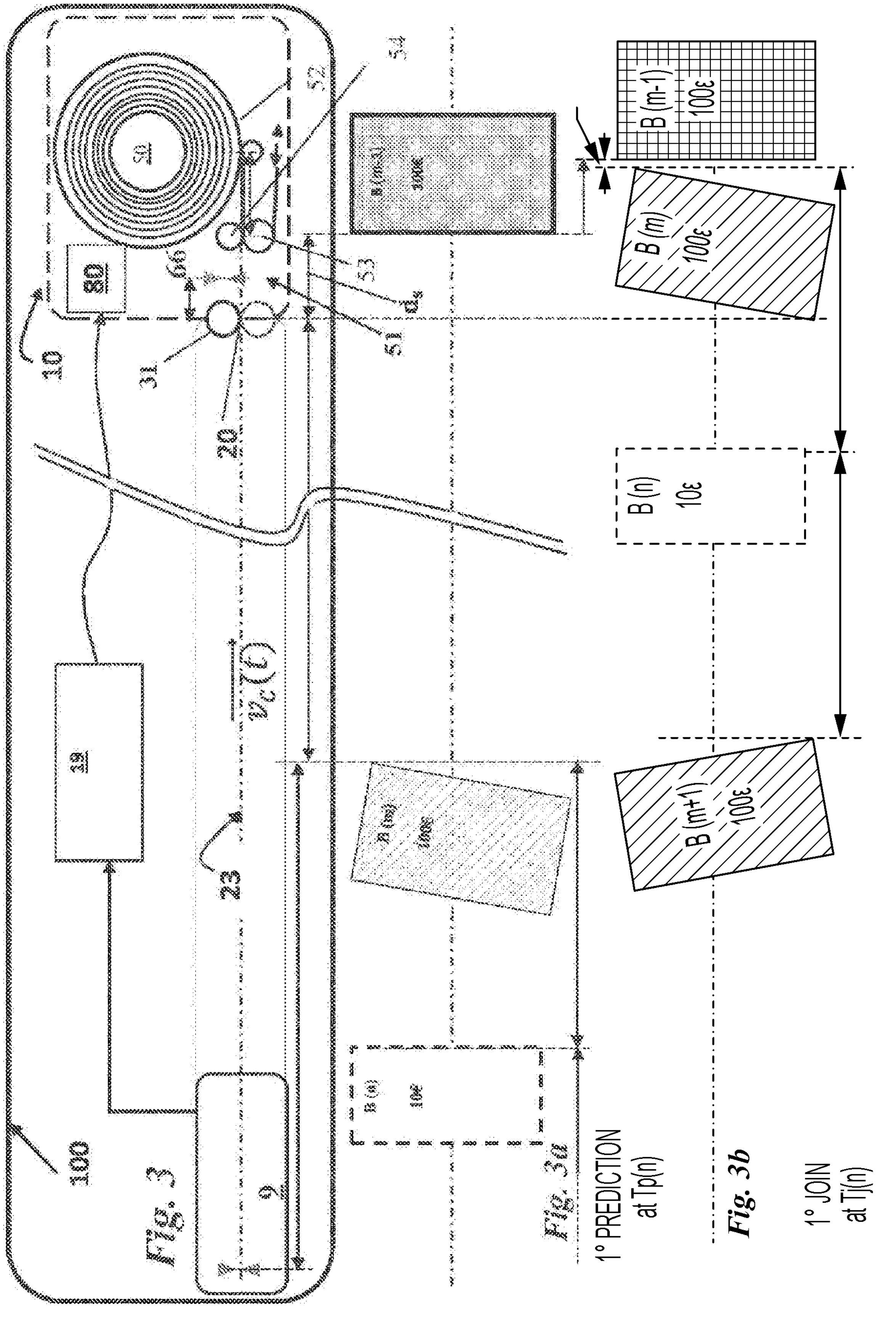
FIG. 3 shows another schematic view of the main hardware elements of the invention system 100, included in the receiving and dispensing device of FIG. 2.
FIGS. 3*a* and 3*b* depict two time-instants during implementation of the method according to the present invention, when a banknote (B(m)) of a series of banknotes ( . . . , B(m−1), B(m), B(m+1), . . . ) is stored in the corresponding storing and issuing module.

With particular reference to FIGS. 2 and 3, it will be appreciated that a system particular reference to FIGS. 2 and 3, it will be appreciated that a system according to the present invention, for storing a series ( . . . , B(m−1), B(m), B(m+1), . . . ) of flexible documents and more particularly banknotes, is generally indicated with reference numeral 100, and can be included in a receiving and issuing device as represented for example in FIGS. 2 and 3.

Such a system 100 comprises at least one storing and issuing module (in FIG. 2 a plurality of them is represented, numbered as 11A, 11B, 10A and 10B while only one, referenced with numeral 10, is shown in FIG. 3), for the automation of cash activities, one conveyor belt 23, configured for supporting and transporting the banknotes in the a receiving and issuing device toward the storing and issuing module(s) at known conveying speed $v_c(t)$, and one sensor group 9, comprising at least one image sensor, the sensor group 9 being arranged with respect to conveyor belt 23 in such a way that it can sense any banknote B(m) being transported on conveyor belt 23 toward the storing and issuing module(s) and provide corresponding sensing information.

The system 100 also comprises a central processing unit 19, which is directly or indirectly operatively connected to the sensor group 9 and configured to receive and process sensing information coming therefrom, and send corresponding control signals to the storing and issuing module(s) 11A, 11B, 10A, 10B or 10, according to the method of the present invention, that will be described in the following.

Figure 5:
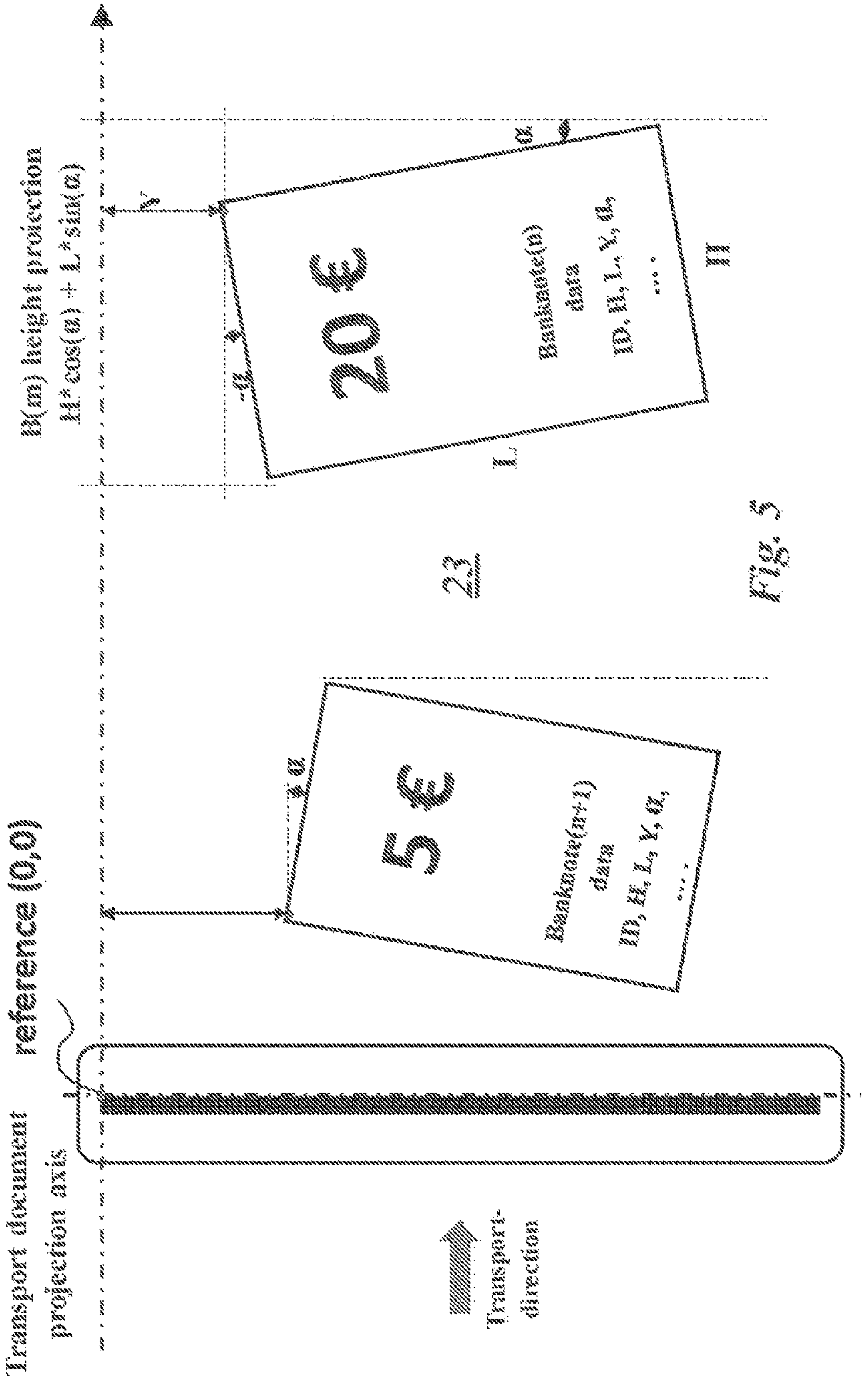
FIG. 5 shows a plan view of a conveyor belt of a flexible document receiving and dispensing device incorporating the invention, the conveyor belt supporting banknotes of different denominations which are angularly displaced with respect to an axis parallel to the longitudinal symmetry axis conveyor belt.

According to the invention, the sensing information provided by sensor group 9, see FIG. 5, comprises at least the dimensions of a sensed banknote B(m) and its position on conveyor belt 23. As can be appreciated, in fact, different denominations or banknote types can have different dimensions (length L and height H, in FIG. 5)—a 5 euros banknote, for example, is smaller than a 20 euros banknote. Also, the banknotes can be placed on conveyor belt 23 in such a way that their front side (i.e., the side of the banknote facing the storing and issuing module(s)) is not perfectly perpendicular to an axis parallel to the longitudinal symmetry axis of conveyor belt 23 but forms, instead, an angle α therewith. By watching FIG. 5, for example, it can be appreciated that the 20 euros banknote has a front end, at its lower right corner, and a rear end, at its upper left corner. The 5 euros banknote, instead, has, its upper right corner as front end and, as rear end, its lower left corner. If a banknote had its front side perfectly perpendicular to the longitudinal symmetry axis of conveyor belt 23, its front end would be represented by the whole front side thereof and its rear end would be represented by its whole rear side, the corresponding angle α being zero. Optionally, the sensing information provided by sensor group 9 can comprises also the distance of each banknote from one lateral edge of conveyor belt 23, and/or the denomination of the sensed banknote, see references Y and/or ID in FIG. 5. The ID, as will be seen below, is associated to the denomination of the sensed banknote, and can be used by the central processing unit 19 to determine to which storing and issuing module of a receiving and dispensing device the banknote should be sent for storage, in case system 100 was provided with more than one storing and issuing module.

According to a preferred embodiment of the invention, once the sensing information is provided to the central processing unit 19, the central processing unit 19 can perform a first check of the sensed banknote B(m), based on the received sensing information. In case the sensed banknote B(m) does not comply with predefined standards in terms of position (on conveyor belt 23) or dimensions, the sensed banknote B(m) is rejected. In practice, whenever a banknote B(m) is rejected, it can be outputted from the device or can be sent to a storing and issuing module from where it is sent to safe disposal.

With particular reference to the storing and issuing module 10 (in the present description, for simplicity, reference will be made to a system comprising only one storing and issuing module 10 as represented in FIG. 3), in the storing and issuing module an opening 20 is formed and respective input transport rollers 31 are comprised at said opening 20, that can be actuated in a known way to engage with a front end of an entering banknote B(m) of a series ( . . . , B(m−1), B(m), B(m+1), . . . ) of banknotes, in order to guide it inside the storing and issuing module 10 along a conveying section 51, toward a respective storage roller 50.

The storing and issuing module 10 comprises, in fact, a storage roller 50 and also a feeding-roller 50' (not shown in FIG. 3 but represented in FIG. 4) as well as respective motors 60 and 60' (also shown in FIG. 4), the motors being configured to coordinately actuate storage roller 50 and the feeding-roller 50', upon receipt of a suitable control signal.

The storing and issuing module 10 also comprises one transport tape 52, having one end connected to storage roller 50 and the other end connected to feeding-roller 50'. The transport tape 52, during banknotes storing operations and due to corresponding coordinated activation of motors 60 and 60', is configured to be unrolled from feeding-roller 50' and rolled on storage roller 50 along a forward path such that, it is moved along a linear path with a linear speed, at the end of conveying section 51, before being rolled around storage roller 50. The motors 60 and 60' optionally are conventional stepper motors, controlled as open-loop servomechanisms, which rotate the storage roller 50 and feeding-roller 50' through proper pulleys and toothed transmission belts (not shown in the drawings).

The storing and issuing module 10 also comprises holding means arranged at conveying section 51, which are configured to be actuated for engaging an entering banknote B(m) with transport tape 52, when the entering banknote B(m) has completely entered the storing and issuing module, i.e. when the rear end of that banknote has passed through opening 20 and has disengaged from transport rollers 31. In detail, the holding means includes a pair of pinch-rollers 53 and 54 arranged below and above transport tape 52. The pinch-rollers are configured to mutually shift under control of electromagnets (not shown in the Figures).

With such a configuration of system 100, it will be noted that any banknote B(m), transported by conveyor belt 23 toward the storing and issuing module 10, enters the module 10 at speed $v_c(t)$ and only when its rear end is disengaged from input roller 31 and is substantially at the same time engaged by holding means 53-54, it starts moving engaged with transport tape 52 at linear speed $v_{t(m)}(t)$.

The storing and issuing module 10 also comprises a processor 80, operatively connected to the central processing unit 19 of the system 100 and to the motors 60 and 60' and the holding means 53-54 above. The processor 80 is configured to determine the diameter of the assembly formed by the storage roller 50, the transport tape 52 and the banknotes engaged with the latter, in a way known in the art. For example, the diameter can be determined based on the diameter of storage roller 50, the number of rotations performed during operation by the storage roller 50 driven by motor 60 (through an encoder connected to the storage roller 50), the thickness of transport tape 52, and the thickness of the banknotes B(m) entering the storage and issuing unit 10. Processor 80 is also configured to determine the patter of linear speed $v_{t(m)}(t)$ of transport tape 52 during storage of a banknote B(m), as will be explained below.

Figure 6:
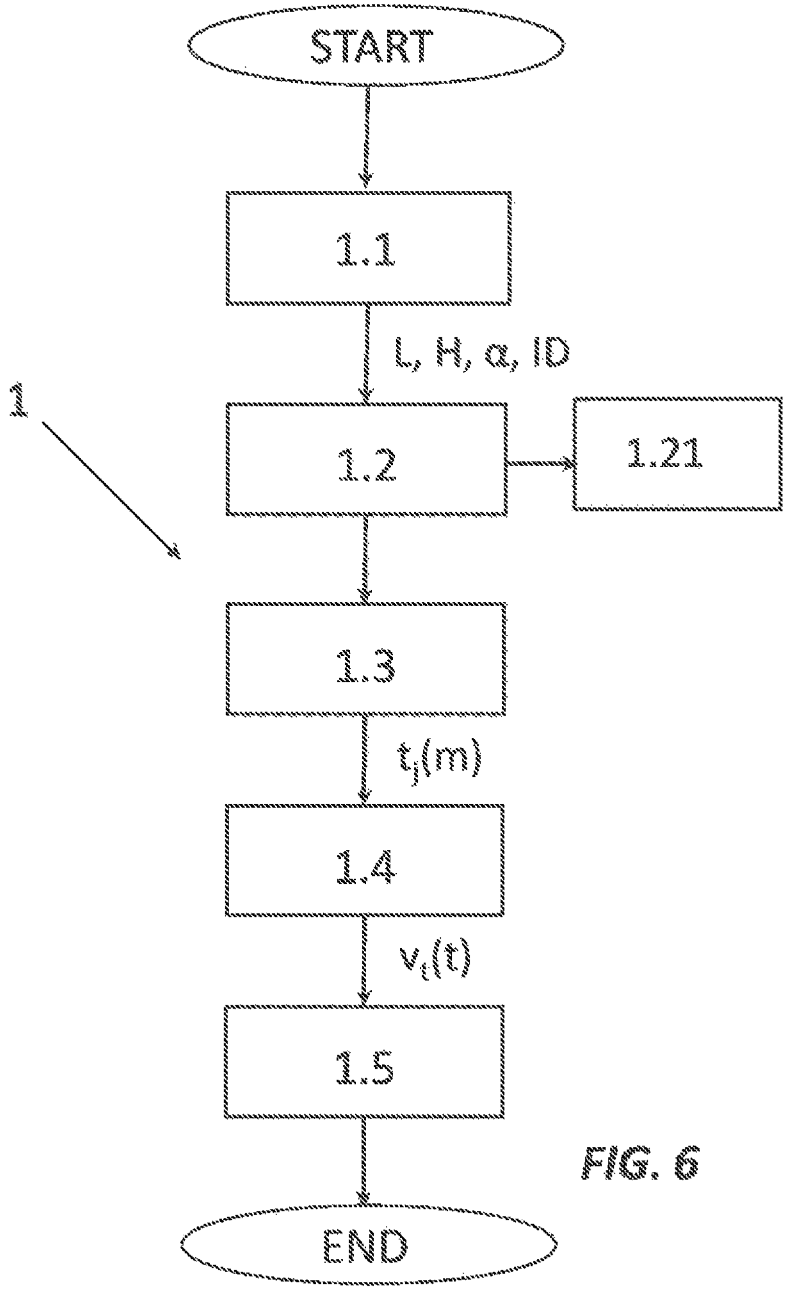
FIG. 6 is a flowchart of the main steps of the invention method.
Figure 7:
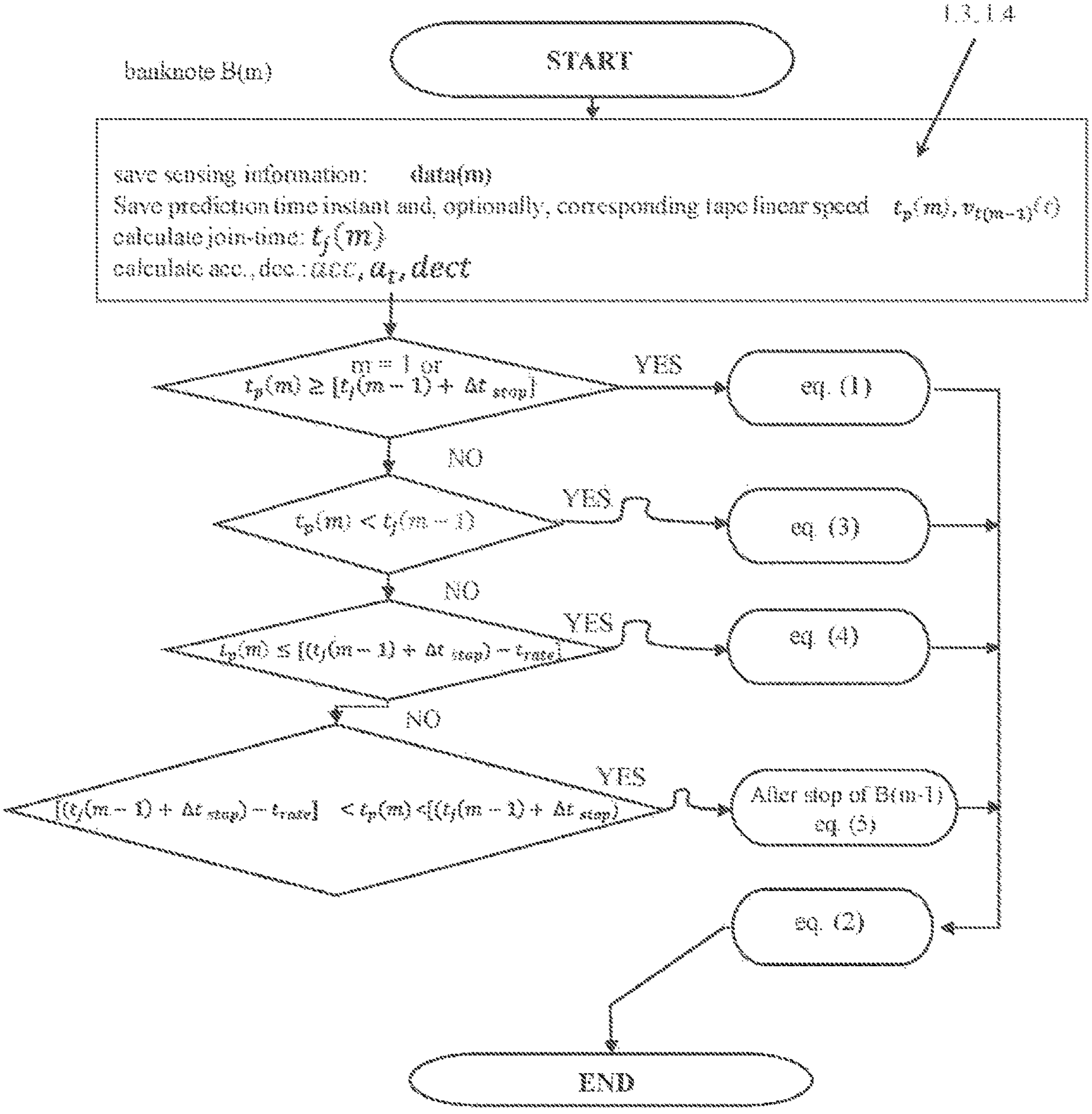
FIG. 7 is another flowchart depicting details of some invention method steps, implemented by a storing and issuing module of invention system.

The method of the present invention for storing a series ( . . . , B(m−1), B(m), B(m+1), . . . ) of flexible documents, more particularly banknotes, in a storing and issuing module 10 of the system 100 above described, is indicated in FIGS. 6 and 7 by reference numeral 1 and comprises, according to a preferred embodiment of the invention, for an $m^{th}$ banknote B(m) of a series ( . . . , B(m−1), B(m), B(m+1), . . . ) of banknotes transported at conveying speed $v_c(t)$ by conveyor belt 23 toward storing and issuing module 10, at a first step 1.1, sensing through sensor group 9, sensing information regarding banknote B(m) and sending the sensing information, to central processing unit 19.

At step 1.2, the central processing unit 19, within a known prediction time instant $t_p(m)$ from sensing, checks the received sensing information to determine whether the sensed banknote B(m) is to be rejected or not and, if not, forwards the sensing information to processor 80 of the storing and issuing module 10. Otherwise, the banknote B(m) is rejected as explained above, at step 1.21.

According to a variant of the present invention, prior to forwarding the sensing information to processor 80, in case more than one storing and issuing module is comprised in system 100, the central processing unit 19 is configured to determine at step 1.2, based on the sensing information, optionally based on the ID of the sensed banknote B(m), the storing and issuing module to which the sensing information are to be forwarded.

Once processor 80 of the storing and issuing module 10 receives the sensing information forwarded by the central processing unit 19, it determines at step 1.3:

- a subsequent joint time instant $t_j(m)$, wherein the rear end of sensed banknote B(m) will have entered the storing and issuing module 10 and will be engaged by holding means 53-54 with transport tape 52, based on the received sensing information and the known conveying speed $v_c(t)$ of conveyor belt 23,
- an acceleration $a_t$, based on the the diameter of the assembly formed by transport tape 52 rolled around storage roller 50, the diameter being calculated as disclosed above, and
- a deceleration value $dec_t$ value, the deceleration value being at least equal or more than double the acceleration value $a_t$.

Following that, at step 1.4, according to method 1 of the present invention, the processor 80 calculates the pattern of linear speed $v_{t(m)}(t)$ at which the transport tape 52 must be moved by storage roller 50, after prediction time instant $t_p(m)$ such that, at estimated joint time instant $t_j(m)$, when the holding means 53-54 engage banknote B(m) with transport tape 52 in the storing and issuing module 10, a predetermined desired distance $d_d$ on transport tape 52 is left between the front end of that banknote B(m) and the rear end of a banknote B(m−1) of the series, last engaged by the transport tape 52, if any. This calculation of processor 80 is performed based on:

the sensing information;

the determined joint time instant $t_j(m)$, acceleration $a_t$ and deceleration $dec_t$ values;

the linear speed profile $v_{t(m-1)}(t)$ determined by processor 80 for a previous banknote B(m−1) of the series, if any.

Finally, method 1 of the invention comprises, at step 1.5, sending by processor 80, and based on the pattern of linear speed $v_{t(m)}(t)$ of transport tape 52 calculated at step 1.4, one or more respective control signal to the motor 60, causing control of storage roller 50 rotation, and therefore a corresponding movement of transport tape 52 according to the calculated speed pattern $v_{t(m)}(t)$ and actuation of holding means 53-54 at $t_j(m)$.

With reference to the above disclosed steps of invention method 1, it is noted that conveying speed $v_c(t)$ of conveyor belt 23 is known and, optionally, advantageously constant over time, at least during execution of invention method 1. Moreover, also the known prediction time instant $t_p(m)$ from sensing is a set value that can be determined based on system 100 parameters such as, for example, the sensing efficiency of sensor group 9, the signal transmission speed between sensor group 9 and central processing unit 19, the computing capacity of central processing unit 19 and the algorithm used. Prediction time instant $t_p(m)$ also depends on the size of the banknotes to be stored in the storing and issuing module 10 and their position of conveyor belt 23. Prediction time instant $t_p(m)$ must be greater than the time required by system 100 to identify a banknote B(m) in the worst case, i.e. where the banknote is the biggest between the banknotes that system 100 can handle and, for example, angle α is the highest angle that central processing unit 19 can accept without rejecting the banknote because of his misplacement on conveyor belt 23. According to a preferred embodiment of the invention, prediction time instant $t_p(m)$ can be a function of conveying speed $v_c(t)$, for example it can be set so that, after $t_p(m)$ and before the sensed banknote B(m) enters the storing and issuing unit 10, central processing unit 19 is able to calculate prediction time instants $t_p(m+i)$ for a number i=1, 2, 3 . . . of following banknotes B(m+i) in the series of banknotes that in the meantime have been sensed by sensor group 9, in average operating condition (for example, when more banknotes are introduced in the receiving and dispensing device, one after the other with a known mean time interval therebetween). Prediction time instant $t_p(m)$ can be set such that the time, after $t_p(m)$, left for the banknote B(m) to enter the storing and issuing module 10 corresponds to at least 105% of the known, possibly adjustable, mean time interval between banknotes ($t_{rate}$, also known as the nominal time interval of the banknote sent to the storing and issuing module 10) at average operating condition so that, in normal operating condition, the central processing unit 19 is capable of determine joint time instants for more than one banknote being stored based on the received sensing information sent by sensor group 9. Prediction time instant $t_p(m)$, therefore, is generally greater than a nominal time interval of the storing and issuing module 10, a minimum variation being considered, for example of the order of ±4%.

As a further remark, it should be noted that, at step 1.2, the sensing information including the dimensions and angle α of a sensed banknote B(m) transported by conveyor belt 23 could be directly sent by the central processing unit 19 to processor 80 or the central processing unit 19 could calculate and send processor 80 a value of the projection of the sensed banknote B(m), along an axis that is parallel to a longitudinal symmetry axis of conveyor belt 23, such projection value being a function of the dimensions of the sensed banknote B(m) and its position on conveyor belt 23, received by sensor group 9. The projection Proj(m) of the m'h banknote transported by conveyor belt 23 could be calculated, as indicated in FIG. 5 as:

$$\mathrm{Proj}(m)=H^{*}\cos(\alpha)+L^{*}\sin(\alpha).$$

In case the projection value of an entering banknote B(m) was calculated by processor 80 upon receipt of dimension information (length L, height H and angle α) of the sensed banknote, such projection value Proj(m) is available before determining the subsequent joint time instant $t_j(m)$ at step 1.3.

According to a particular advantageous aspect of the invention, the pattern of linear speed $v_{t(m)}(t)$ of transport tape 52 calculated at step 1.4, required to store banknote B(m) in the storing and issuing module 10 at desired $d_d$ distance from a last engaged banknote B(m−1), if any, is associated to a linear acceleration constant value $a_t$, determined at step 1.3, that depends on the configuration of the system 100 and is a function of the Inertia value of the assembly formed by storage roller 50, transport tape 52 and the banknotes engaged therewith, which Inertia value is in turn a function of the diameter of the assembly and increases as more banknotes are engaged with transport tape 52 and rolled therewith on storage roller 50.

More particularly, according to a specific advantageous aspect of the invention method 1, the greater the inertia of the assembly formed by storage roller 50, transport tape 52 and the banknotes, the lower the selected linear acceleration value $a_t$, in order to keep substantially constant the inertial torque seen by motor 60 and therefore the power required to move, in use, the assembly formed by storage roller 50, transport tape 52 and the banknotes engaged therewith, independently of the diameter thereof.

According to a more specific aspect of the invention method 1, the linear acceleration constant value $a_t$, is a function of the diameter of the assembly formed by storage roller 50, transport tape 52 and the banknotes engaged therewith, which diameter can be calculated by the processor 80 of the storing and issuing module 10, as disclosed above.

Figure 4:
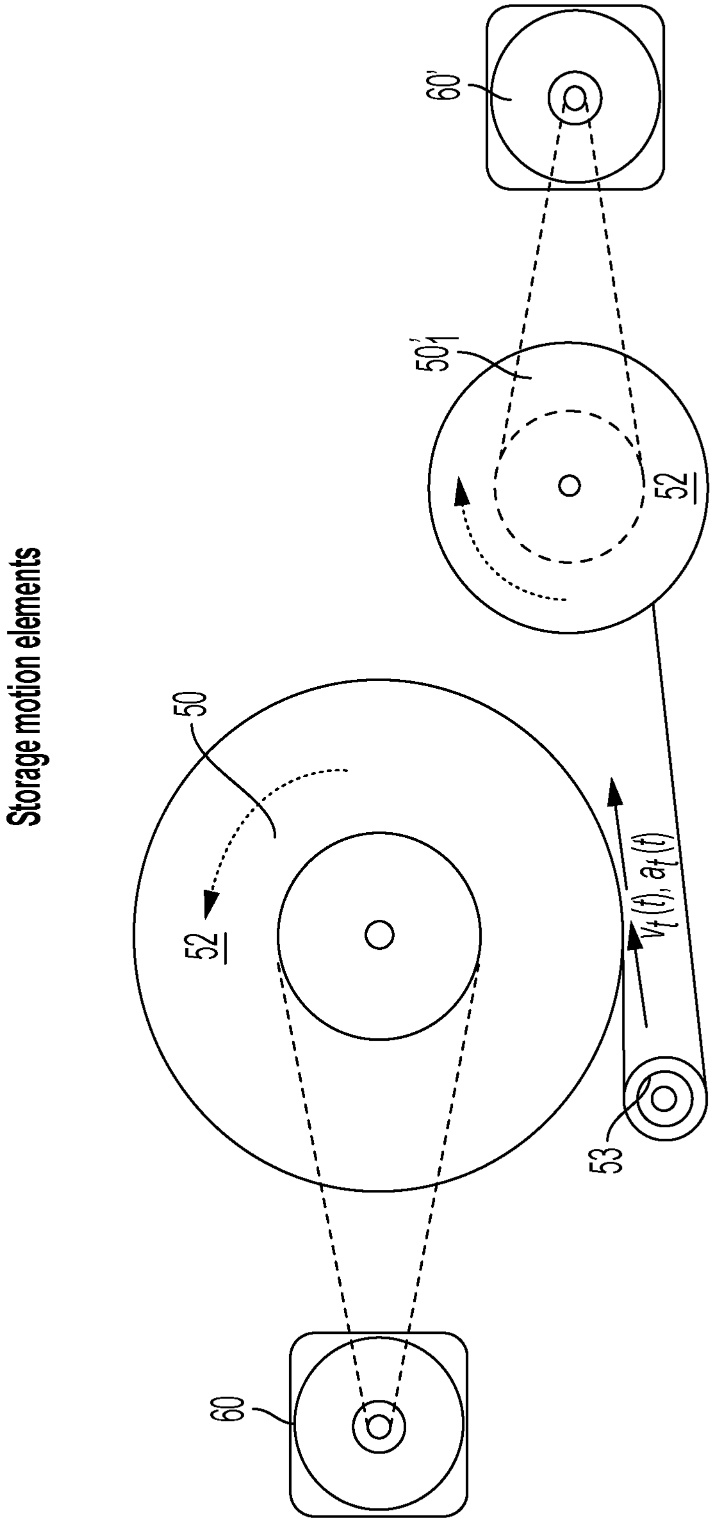
FIG. 4 is a schematic representation of hardware components of a preferred embodiment of a storing and issuing module, which contribute to the inertial torque seen by the motor responsible for actuation of a storage roller.

Just to give one clarifying example of the invention, with a configuration of the storing and issuing module 10 as that depicted in FIG. 4, the total inertia $I_{tot60}$, seen by motor 60 responsible for actuation of storage roller 50 can be modelled, as shown in FIG. 4, as a function of known transmission ratios (Z . . . /Z . . . ) of the wheels/pulleys of the system 100 motion elements which ratios, being dimensionless, can refer to the number of teeth thereof and their corresponding pitch diameters.

All such values regarding wheels/pulleys are obviously known and constants while the only independent variable is the diameter $Ø_{50+52}$ of the assembly formed by transport tape 52 and banknotes rolled on the storage roller 50, which can be calculated and provided by processor 80 as described above, the diameter $Ø_{50+52}$ of the assembly formed by transport tape 52 and feeding roller 50' being derivable once the length of transport tape 52 is known and also the diameter of feeding roller 50'.

The main component of the total inertia $I_{tot60}$ in the equation shown in FIG. 4 is the one regarding storage roller 50, which shows the larger diameter as the banknotes are being stored and is the only one including the banknotes.

With this configuration the inertial torque seen by motor 60, i.e. the product of the total inertia $I_{tot60}$ seen by motor 60

(FIG. 4*a*, which increases as the diameter of the assembly formed by storage roller 50, transport tape 52 and the banknotes engaged therewith increases) and the angular acceleration of its motor shaft can be kept constant and independent of the assembly diameter, by selecting an angular acceleration value acc for motor shaft (FIG. 4*b*), and a corresponding linear acceleration value $a_t$ of transport tape 52, that correspondingly decreases, as the diameter $Ø_{50+52}$ of the assembly formed by storage roller 50, transport tape 52 and the banknotes engaged therewith increases.

Figure 4A:
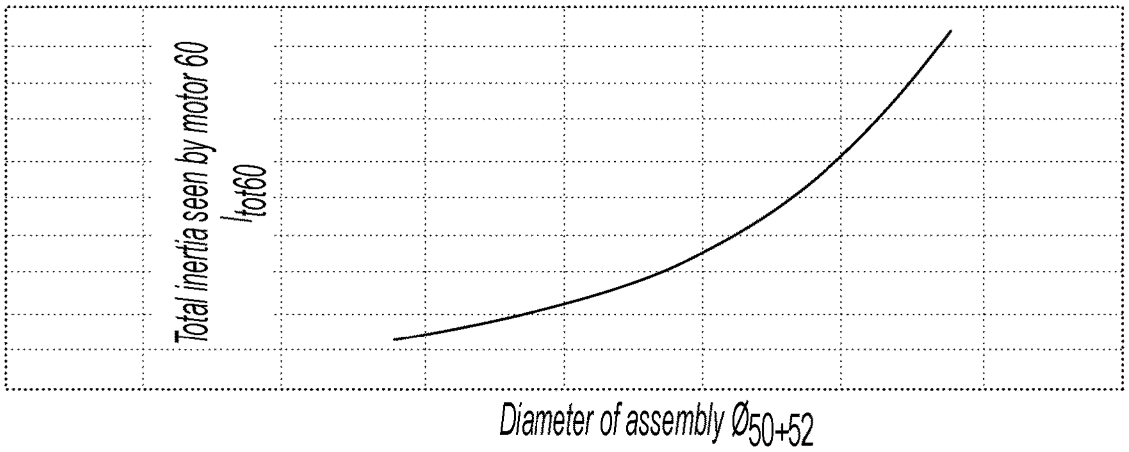
FIGS. 4*a* to 4*c* are respective graphical representation of the total inertia, angular acceleration and inertial torque seen by the motor responsible for actuation of a storage roller of the storing and issuing module of FIG. 4.
Figure 4B:
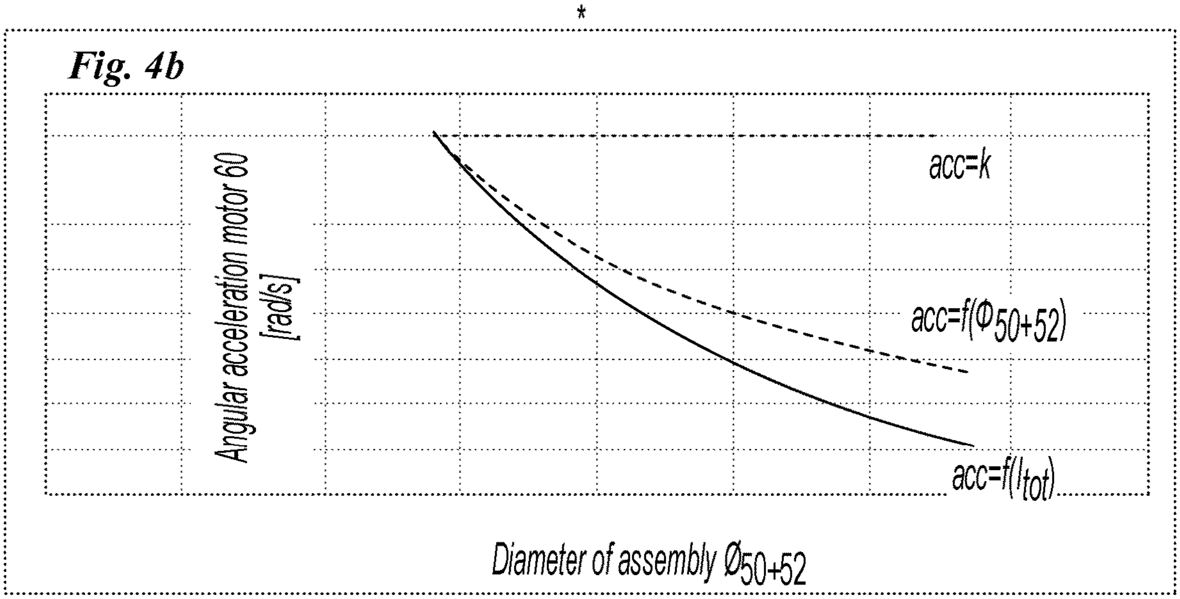
Figure 4C:
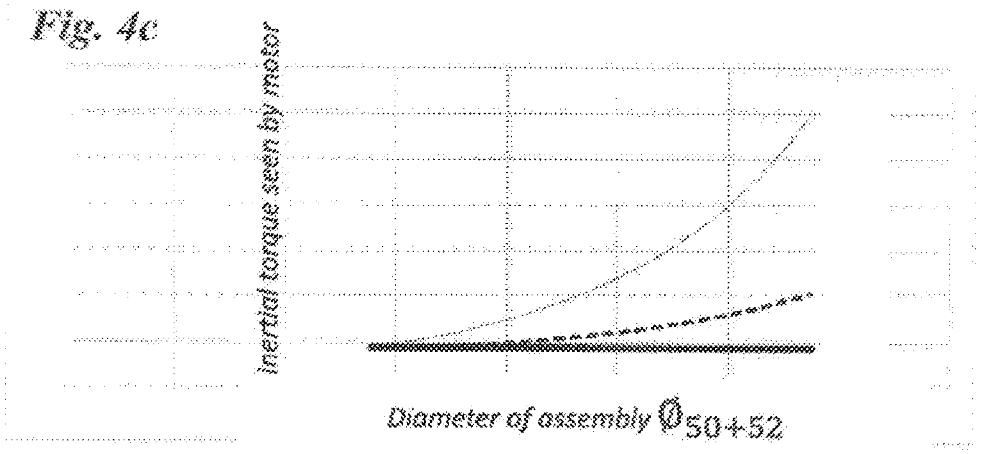

By way of example FIGS. 4*a* to 4*c* show respectively the pattern of the total inertia $I_{tot60}$ seen by motor 60, the angular acceleration thereof and the inertial torque, as function of the assembly diameter $Ø_{50+52}$, for a traditional storing and issuing module 10 configured to store up to 1000 banknotes. Those figures clearly show that if the angular acceleration acc of the motor shaft of motor 60 is not proportionally inverse to the total Inertia $I_{tot60}$, the inertial torque seen by motor 60 increases with the diameter $Ø_{50+52}$ of the assembly, i.e. as the number of stored banknotes in the storing and issuing module 10 increases.

FIG. 4*c*, in particular, shows that if the angular acceleration of motor 60 (and accordingly the corresponding linear acceleration $a_t$ of transport tape 52) is chosen as being inversely proportional to the total inertia seen by motor 60, then the inertial torque does not increase, and the power consumption required to move the assembly formed by storage roller 50, transport tape 52 and the banknotes engaged therewith remains constant as the number of banknotes stored increases. In all other cases, for example as shown in FIGS. 4*b* and 4*c*, with a constant angular acceleration of motor shaft (acc=k, normally used in prior art storing and issuing modules) or an angular acceleration thereof inversely proportional to the diameter calculated by processor 80, i.e. acc=f($\phi_{50+52}$), the inertial torque of motor 60 increases with the diameter and so the power consumption required to move storage roller 50.

According to a preferred embodiment of the invention method 1, the linear acceleration constant value $a_t$ for the pattern of transport tape 52 linear speed $v_{t(m)}(t)$ can be calculated in real time, during the execution of the invention method at step 1.3, based on the diameter information calculated by processor 80 of storing and issuing module 10, or can be selected on a lookup table that has been prestored in the processor 80, providing a corresponding acceleration $a_t$ for a corresponding Inertia value, function of diameter value.

As can be seen in FIG. 4*b*, as the diameter of the assembly formed by storage roller 50, transport tape 52 and the banknotes engaged therewith increases, the angular acceleration value of the motor shaft of motor 60 selected according to the invention method (acc=f($I_{tot}$)) can be much lower than the angular acceleration value normally used in prior art storing and issuing modules, which is constant (acc=k). This lower angular acceleration and corresponding linear acceleration $a_t$ of transport tape 52 require an advanced activation (at activation time instant $t_p(m)<t_a(m)<t_j(m)$) of the storage roller motor 60, in order to cover the same angular displacement of storage roller 50 or linear displacement of transport tape 52 at its linear path at the end of conveying section 51, that would be covered with higher accelerations according to the prior art.

Accordingly, when a large number of banknotes is stored (i.e. rolled up with transport tape 52 around storage roller 50) and the corresponding diameter of the assembly is high, the motor 60 of storage roller 50 having a low angular acceleration must be started at activation time instant $t_a(m)$ well before entry of a corresponding entering banknote B(m) in the storing and issuing module 10, to cause the required linear displacement of transport tape 52 such that, when that entering banknote B(m) is engaged by holding means 53-54, its front end is at desired distance $d_d$ ($d_d$ being, for example, 3 mm±3 mm) from the previously engaged banknote B(m−1) rear end, if any.

With low angular acceleration values, contrary to the prior art methods, it is not possible to make use of any sensor placed at conveying section 51 (sensor 66 in the prior art storing and issuing module described above), to provide a corresponding start signal to motor 60, because it will not be possible to move transport tape 52, for the length required to leave the desired distance $d_d$ between banknotes engaged therewith, in time.

According to a preferred embodiment of invention method 1, when an entering banknote B(m) of the series of banknotes ( . . . , B(m−1), B(m), B(m+1), . . . ) is sensed by sensor group 9 and transport tape 52 is not moving, either because B(m) is the very first banknote of the series or because $t_p(m)t \geq (t_j(m-1)+\Delta t_{stop})$, where $t_j(m-1)$ is the joint time instant of the last sensed banknote B(m−1) of the series and $\Delta t_{stop}$ is a known time interval required to take a banknote to a resting or stop position on transport tape 52 with its rear end at a stop distance ds from opening 20, i.e. in case the storage of a last sensed banknote B(m−1) in the storing and issuing module 10 has already been completed (for example as represented in FIG. 3*a*), then the pattern of linear speed $v_{t(m)}(t)$ of transport tape 52 is calculated, so that, between $t_p(m)$ and $t_j(m)$, it satisfies rule:

$$\int_{t_p(m)}^{tj(m)} v_{t(m)}(t)dt = \text{Proj}(m) + d_d - d_s \quad (1)$$

and as a default setting, after $t_j(m)$, it satisfies rule:

$$\int_{t_j(m)}^{tj(m)+\Delta t_{stop}} v_{t(m)}(t)dt = d_s \quad (2)$$

According to a preferred embodiment of the invention $d_s$ is comprised between 70% and 100% of the height H of the smallest banknote to store in storing and issuing module (for example it is 62 mm for a 5 euros banknote).

Still according to a preferred embodiment of the invention $\Delta t_{stop}$ is greater than $t_{rate}$ and, according to a further preferred embodiment of the invention, $\Delta t_{stop} = 1.5 * t_{rate}$.

According to the invention method 1, what happens to the pattern of linear speed of transport tape 52, in case in a new entering banknotes B(m), . . . is sensed on conveyor belt 23, depends on its respective prediction time instants with respect to the pattern of transport tape 52 linear speed for the last sensed banknote.

According to a preferred embodiment of the invention, if a new entering banknote B(m) is sensed at $t_p(m) \leq t_j(m-1)$, i.e. if $t_j(m)$ is calculated by processor 80 for banknote B(m) before the last sensed banknote B(m−1) is engaged with transport tape 52, then the pattern of linear speed $v_{t(m)}(t)$ of transport tape 52 is calculated that, between $t_j(m-1)$ and $t_j(m)$, satisfies rule:

$$\int_{t_j(m-1)}^{tj(m)} v_{t(m)}(t)dt = \text{Proj}(m) + d_d \quad (3)$$

where: $t_j(m-1)$ is the joint time instant of the previous banknote B(m−1) of the series, that has last entered the storing and issuing module 10. As a default setting, after $t_j(m)$, the pattern of linear speed $v_{t(m)}(t)$ is set by processor 80 to satisfy rule:

$$\int_{t_j(m)}^{tj(m)+\Delta t_{stop}} v_{t(m)}(t)dt = d_s \quad (2)$$

as also disclosed above.

Alternatively, in case a new entering banknote B(m) is sensed at $t_j(m-1)<t_p(m)\leq(t_j(m-1)+\Delta t_{stop})-t_{rate}$, i.e. when or after last sensed banknote B(m−1) has been engaged with transport tape 52, in advance of $t_{rate}$ with respect to time instant of complete stop at stop distance ds of last engaged banknote B(m−1), then linear speed $v_{t(m)}(t)$ of transport tape 52 is calculated that, between $t_j(m-1)$ and $t_j(m)$, satisfies rule $$\int_{tj(m-1)}^{tp(m)} v_{t(m-1)}(t)dt+\int_{t_p(m)}^{tj(m)} v_{t(m)}(t)dt=\text{Proj}(m)+d_d \tag{4}$$

As above, as a default setting, after $t_j(m)$, the pattern of linear speed of transport tape 52, for storage of banknote B(m) satisfies rule:

$$\int_{tj(m)}^{tj(m)+\Delta tstop} v_{t(m)}(t)dt=d_s \tag{2}$$

In case a new entering banknote B(m) is sensed at $(t_j(m-1)+\Delta t_{stop})-t_{rate}<t_p(m)<(t_j(m-1)+\Delta t_{stop})$ i.e. if $t_j(m)$ is calculated when last engaged banknote B(m−1) is closer than $t_{rate}$ to time instant of complete stop at stop distance $d_s$, then the linear speed $v_{t(m)}(t)$ of transport tape 52 is updated that, after stop of last engaged banknote B(m−1), satisfies rule:

$$\int_{tj(m-1)+\Delta t_{stop}}^{tj(m)} v_{t(m)}(t)dt=\text{Proj}(m)d_d-d_s \tag{5}$$

As above, as a default setting, after $t_j(m)$, the pattern of linear speed of transport tape 52, for storage of banknote B(m) satisfies rule:

$$\int_{tj(m)}^{tj(m)+\Delta tstop} v_{t(m)}(t)dt=d_s \tag{2}$$

FIGS. 8 to 11 represent possible speed patterns for transport tape 52, calculated according to an exemplary implementation of invention method 1.

Figure 8:
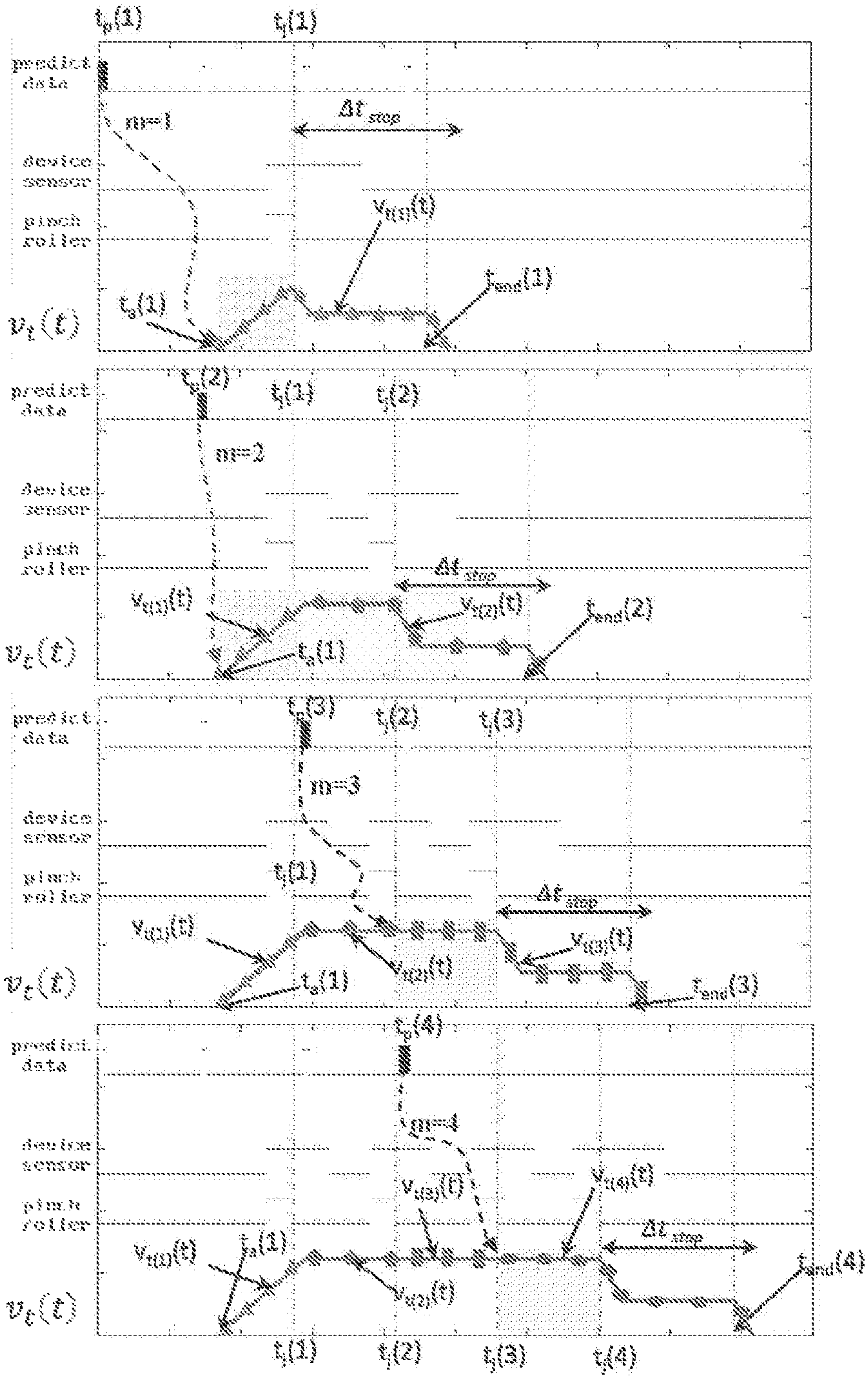
FIGS. 8 to 11 are graphical representations of the speed of the transport-tape at the end of a conveyor section of a storing and issuing module, the speed being calculated according to the invention method, in different cases of banknotes storage.

FIG. 8, for example, represents the case where four banknotes B(1), B(2), B(3) and B(4) are stored in a storing and issuing module 10, in the case where another banknote B(0) had been previously stored (engaged with transport tape 52 at distance $d_s$ from opening 20). The four windows of FIG. 8 represent, from top to bottom, how the linear speed pattern of transport tape 52 is set by processor 80 over time, as the processor 80 of the invention system 100 receives sensing information by the central processing unit 19 (predict data in the figure) and calculates joint time instants $t_j(1)$, $t_j(2)$, $t_j(3)$ and $t_j(4)$ of banknotes to be stored. The method of the invention, as can be seen on the first window of FIG. 8, determines the linear speed pattern $v_{t(1)}(t)$ of transport tape 52 required to store banknote B(1) as above described, such that before $t_j(1)$ transport tape 52 has moved of the required distance in order to allow rear end of the previously stored banknote B(0) to be at distance $d_d$ from front end of banknote B(1), according to equation (1) above. The integral of $v_{t(1)}(t)$ between $t_p(m)$ and $t_j(1)$, i.e. the represented area under signal $v_{t(1)}(t)$ between time instants $t_p(m)$ and $t_j(1)$, corresponds to $\text{Proj}(1)+d_d-d_s$. As is shown in this window, an activation time instant $t_a(1)$ is determined by processor 80, at which motor 60 will be activated to cause the required movement of transport tape 52 before $t_j(1)$. The activation time instant can be determined according to a preferred embodiment of the invention method, as will be described below.

After $t_j(1)$, if no other banknotes are sensed, $v_{t(1)}(t)$ is set by processor 80, according to equation (2), such that banknote B(1) is taken to the rest position and, in fact, the integral of $v_{t(1)}(t)$, between $t_j(1)$ and $t_j(1)+\Delta t_{stop}$ is equal to $d_s$.

In the second window, the case is depicted where just before activation of motor 60, i.e. before $t_a(1)$, another banknote is sensed and processor 80 has determined a corresponding joint time instant $t_j(2)$. Since $t_j(2)$ has been determined at $t_p(2)\leq t_j(1)$, then a new pattern of linear speed of transport tape 52 can be set by processor 80 such that:

- between $t_a(1)<t_j(1)$, the integral of $v_{t(1)}(t)$, i.e. the represented area under the linear speed curve of transport tape 52 between time instants $t_a(t)$ and $t_j(1)$, corresponds to $\text{Proj}(1)+d_d-d_s$; and
- between time $t_j(1)$ and $t_j(2)$ transport tape 52 moves at $v_{t(2)}(t)$ of a length equal to $\text{Proj}(2)+d_d$, so that the rear end of B(1), at $t_j(2)$ has moved together with transport tape 52 of the length required to leave distance $d_d$ between banknotes B(1) and B(2). Then the pattern of linear speed of $v_{t(2)}(t)$ is set by processor 80 such that after $\Delta t_{stop}$ the second banknote B(2) is brought at resting position, since no other incoming banknote has been sensed in the meantime.

The third window shows what happens in the system 100 when the third banknote B(3) of the series is sensed and corresponding joint time instant $t_j(3)$ is calculated at $t_p(3)\leq t_j(2)$. As above, processor 80 changes linear speed of transport tape 52 after $t_j(2)$ according to equation (3), so that between $t_j(2)$ and $t_j(3)$ the second banknote B(2) is moved at linear speed $v_{t(3)}(t)$ together with transport tape of $\text{Proj}(3)+d_d$, and after $t_j(3)$ the pattern of linear speed of $v_{t(3)}(t)$ is set by processor 80 such that after $\Delta t_{stop}$ the third banknote B(3) is brought at resting position, since no other incoming banknote has been sensed in the meantime. When a fourth banknote B(4) is sensed, and corresponding joint time instant $t_j(4)$ is calculated at $t_p(4)\leq t_j(3)$, then processor 80 calculates linear speed of transport tape 52 after $t_j(3)$, so that between $t_j(3)$ and $t_j(4)$ the third banknote B(3) is moved at linear speed $v_{t(4)}(t)$ together with transport tape of $\text{Proj}(4)+d_d$, and then, after $t_j(4)$ the pattern of linear speed of $v_{t(4)}(t)$ is set by processor 80 such that after $\Delta t_{stop}$ the fourth banknote B(4) is brought at resting position, since no other incoming banknote has been sensed in the meantime. How the pattern of linear speed is set by processor 80 during execution of the invention method will be disclosed below.

Figure 9:
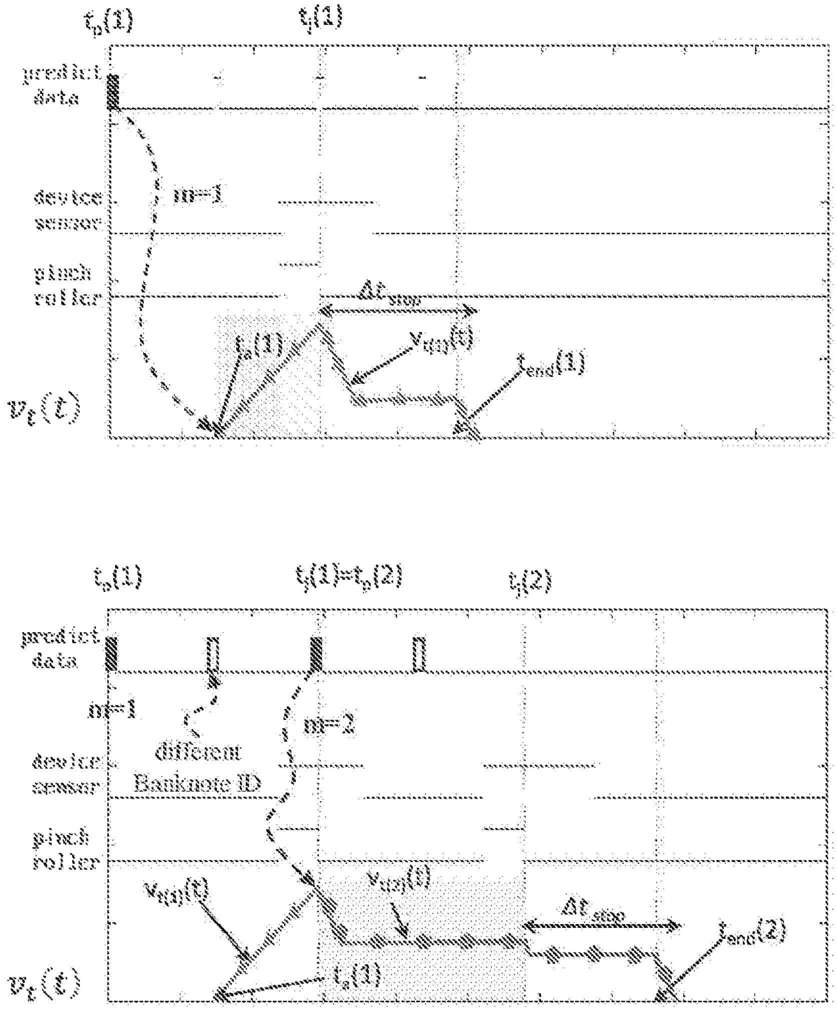

A similar case in represented in FIG. 9. In this case, however, only the first and third banknote transported by conveyor belt 23 are to be stored in storing and issuing module 10, the second one, for example, being a banknote of a different denomination and, for this reason, directed to another storing and issuing module of the receiving and dispensing device. In this case $t_j(2)$ has been determined at $t_p(2)=t_j(1)$. The pattern of transport tape linear speed for storing banknote B(2) is set by processor 80 according to equation (3) above, such that between time $t_j(1)$ and $t_j(2)$ transport tape 52 moves at linear speed $v_{t(2)}(t)$ of $\text{Proj}(2)+d_d$ and the rear end of B(1), at $t_j(2)$ has moved together with transport tape 52 of the length required to leave distance $d_d$ between banknotes B(1) and B(2). Then the linear speed of $v_{t(2)}(t)$ is set by processor 80 such that after $\Delta t_{stop}$ the second banknote B(2) is brought at resting position, since no other incoming banknote to be stored in that storing and issuing module 10 has been sensed in the meantime.

Figure 10:
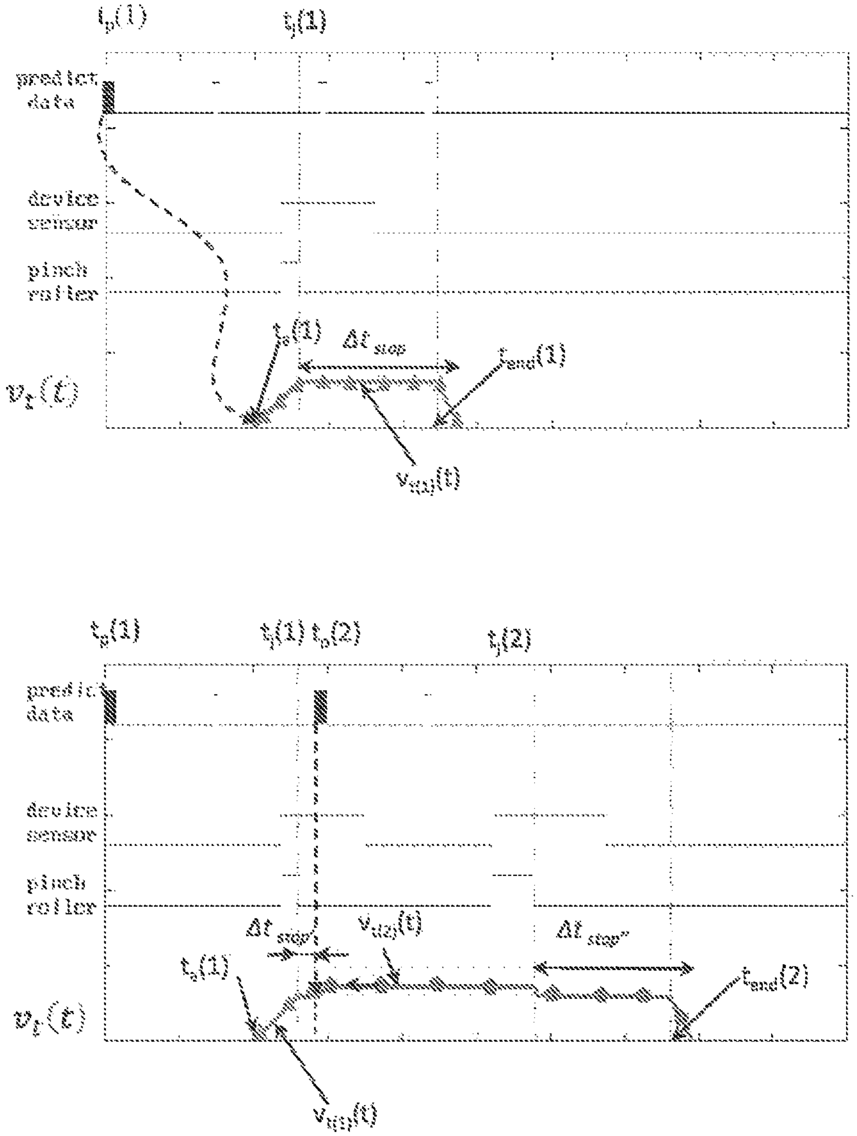

In FIG. 10, the case is represented wherein a second banknote B(2) is sensed and identified by system 100 at $t_j(1)<t_p(2)\leq(t_j(1)+\Delta t_{stop})-t_{rate}$, i.e. after the engagement of the first banknote B(1) when transport tape 52 has already started moving banknote B(1) in the rest position because before engaging that banknote at $t_j(1)$—upper window—no other banknotes had been sensed and identified. In this case, processor 80 sets linear speed of transport tape for storage of banknote B(2) according to equation (4), such that:

- after $t_j(1)$ and before prediction time instant $t_p(2)$ (for a time interval $\Delta t_{stop}'$), the first banknote B(1) moves together with transport tape 52 at speed $v_{t(1)}(t)$; and between prediction time instant $t_p(2)$ and joint time instant $t_j(2)$ (for a time interval $\Delta t_{stop}$") the first banknote B(1) moves together with transport tape 52 at $v_{t(2)}(t)$.

The total length covered between $t_j(1)$ and $t_j(2)$ is the one required to leave the second banknote B(2) space enough to enter the storing and issuing unit 10 and being engaged with transport tape 52 with its front end at distance $d_d$ from rear end of banknote B(1), according to equation (4) above.

Figure 11:
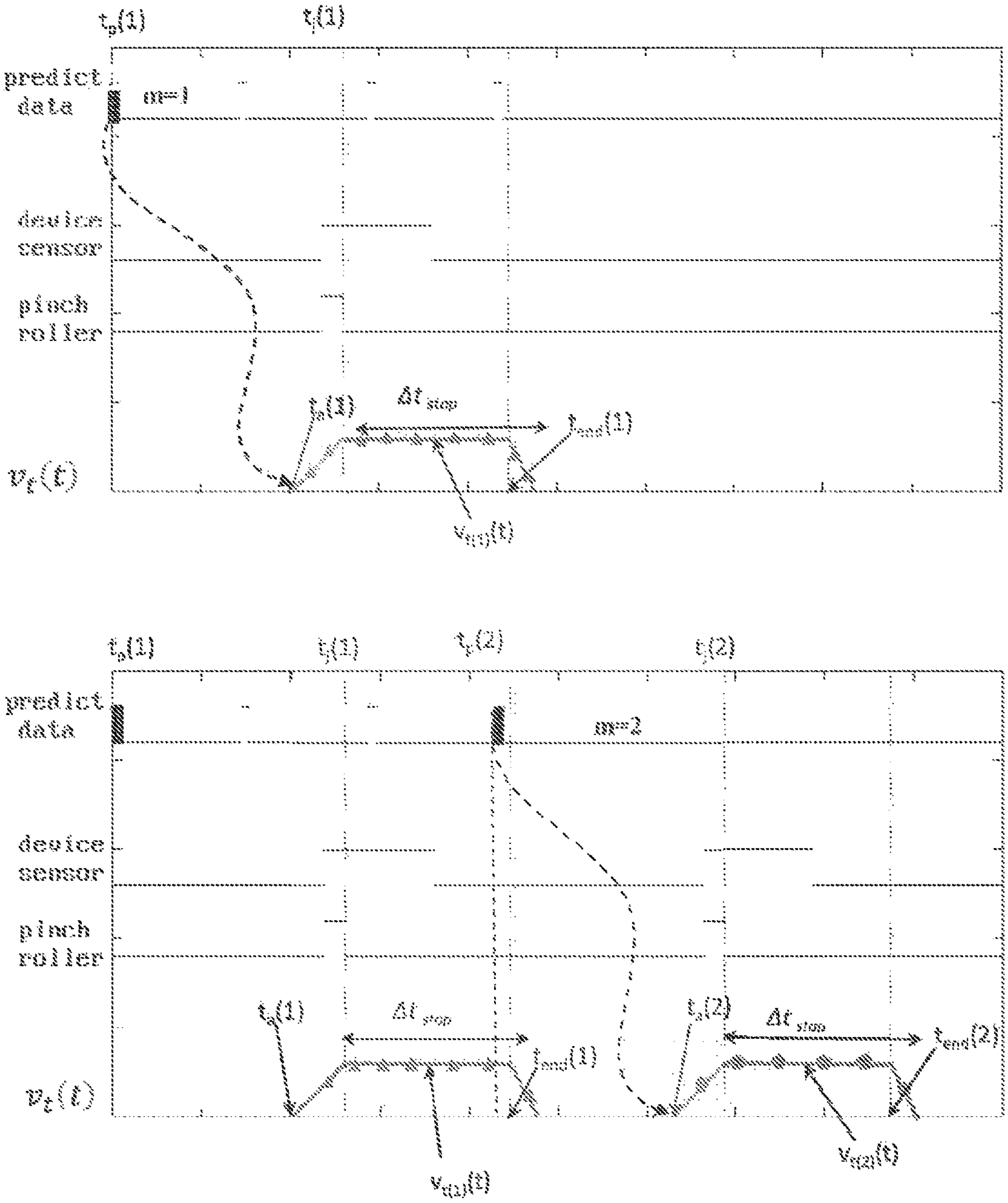

FIG. 11, depicts the case where a second banknote B(2) is sensed too late, at $(t_j(1)+\Delta t_{stop})-t_{rate}<t_p(2)<(t_j(1)+\Delta t_{stop})$, when the first banknote B(1) has already engaged with transport tape 52 and is almost at rest position (at stop distance $d_s$ from opening 20). In this case, transport tape 52 is let stop and its linear speed for storing the second banknote B(2) is set by processor 80 according to equation (5) so that, after stop at $t_j(1)+)+\Delta t_{stop}$, at activation time $t_a(2)$, it will move at $v_{t(2)}(t)$ in order to cover just the length required to leave distance $d_d$ between the rear end of the first B(1) banknote and the front end of the second banknote B(2). After $t_j(2)$, the linear speed of transport tape 52 is set according to equation (2).

The skilled person will note that there are many ways for processor 80 to set the pattern of linear speed $v_{t(m)}(t)$ of transport tape 52 for any banknote B(m) to be stored, as long as the integral thereof, between two time-instants of interest, corresponds to the required linear displacement of transport tape 52, necessary to leave desired distance $d_d$ between the rear end of the last engaged banknote and the front end of an engaging banknote.

Figure 12:
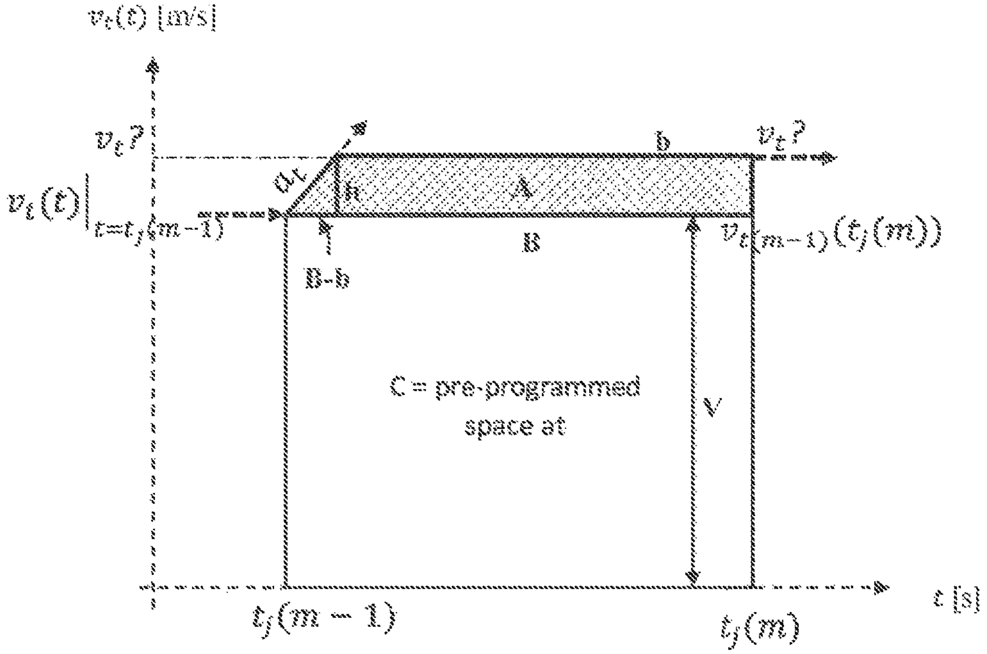
FIGS. 12 and 13 show graphically two examples of how the pattern of transport-tape speed at the end of conveyor section of the storing and issuing module can be calculated, according to a preferred embodiment of the invention.

However, according to a preferred advantageous embodiment of the invention method 1, the pattern of linear speed $v_t(t)$ of transport tape 52 can be defined as a line segment or a chain of line segments, as represented in FIG. 12. In FIG. 12, the case is represented where transport tape 52 is moving and prediction time instant $t_p(m)$ of the $m^{th}$ sensed banknote B(m) is such that $t_p(m) \leq t_j(m-1)$. FIG. 12 shows that the speed pattern of transport tape 52 is always associated to:

- a constant linear acceleration value $a_t$, inversely proportional to the total inertia as described above, which varies with the diameter of the assembly formed by storage roller 50, transport tape 52, and the banknotes engaged therewith, the diameter being calculated by processor 80, and
- a constant speed target value $v_t$, that can be easily calculated according to the formulas shown in FIG. 12, once two following joint time instants $t_j(m-1)$ and $t_j(m)$ have been determined by processor 80 (distance $B=t_j(m-1)-t_j(m)$ in FIG. 12), the distance (area (C+A) in FIG. 12) that the rear end of the last engaged banknote B(m−1) needs to cover with transport tape 52 in order to allow the entering banknote B(m), when also engaged by transport tape 52, to have its front end at $d_d$ from rear end of B(m−1), is also known, and the pattern of linear speed $v_{t(m-1)}(t)$ of transport tape 52 for the last sensed banknote B(m−1), is estimated by processor 80 (V in FIG. 12 is $v_{t(m-1)}(t_j(m-1))$).

The skilled person will have no difficulties in understanding how the blank area under the trapezius, identified by letter C in FIG. 12, corresponds to the linear displacement that transport tape 52 would cover, after engagement of last engaged banknote B(m−1) and before engagement of the entering one B(m), if it continued moving at previous speed $v_{t(m-1)}(t)$. A is the additional linear movement that transport tape 52 needs to cover, after engagement of previously engaged banknote B(m−1), in order to assure proper distance $d_d$ between the previously engaged B(m−1) and the entering banknote B(m).

The skilled person would also easily understand that modeling linear speed of transport tape 52 as line segment or a chain of line segments, as a function of a constant acceleration value $a_t$ and a constant linear speed value $v_t$, is advantageous not only because it allows identifying the pattern of that linear speed very easily, but also because it allows handling banknotes of different dimensions, for example in case a storing and issuing module 10 was used as recycling module for damaged banknotes of all denominations, having them very different dimensions. In this case, A could also depend on the denomination of the entering banknote B(m) to be stored.

Figure 13:
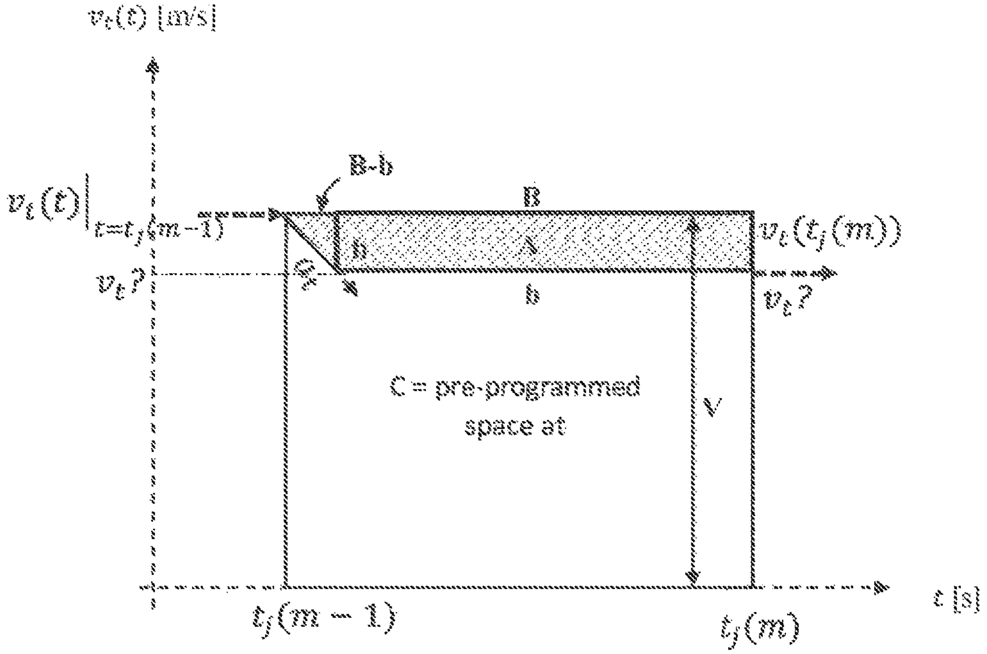

FIG. 12, however, shows just an example, and does not cover all cases of system operation described above, which, however, can be easily determined by the skilled person given the above disclosure. For example, if the entering banknote B(m) was smaller than the one previously engaged B(m−1), the area C in FIG. 12, should be reduced by area A—see the corresponding graph—and the acceleration value $a_t$ would be negative (see FIG. 13), i.e. the transport tape should decelerate.

As a further example, in the case wherein transport tape 52 is not moving when a banknote B(m) is sensed, for example because the sensed banknote is the very first banknote of the series, processor can set $v_{t(m)}(t)$ as a line segment starting from activation time instant $t_a(m)$ with acceleration $a_t$. Activation time instant $t_a(m)$ can be easily determined given that the area under signal $v_{t(1)}(t)$ between time instants $t_a(t)$ and $t_j(1)$ must correspond to $Proj(1)+d_d-d_s$.

As a final example, according to a preferred embodiment of the invention, the speed pattern of transport tape 52 during time interval $\Delta t_{stop}$, can be associated, to:

- a constant linear acceleration value $a_t$, inversely proportional to the total inertia as described above, which varies with the diameter of the assembly formed by storage roller 50, transport tape 52, and the banknotes engaged therewith, the diameter being calculated by processor 80,
- a constant speed target value $v_t$, and also
- a constant deceleration value $dec_t$, which is advantageously at least double the constant linear acceleration value $a_t$.

In this case, as can be seen, for example in FIGS. 8-11, the speed pattern of transport tape 52 comprises at least a final line segment at constant deceleration value $dec_t$ that, between $t_{end}(m)$ and $t_j(m)+\Delta t_{stop}$ brings $v_{t(m)}(t)$ to zero.

The method and system according to the invention reach the goals disclosed in the preamble above.

First of all, with the invention method a larger number of banknotes can be stored in a single storing and issuing module, having a transport tape 52 longer than one usually used in prior art storing and issuing modules, with no increase in power consumption, due to the fact that the acceleration value $a_t$ of the assembly formed by storage roller 50, transport tape 52 and the engaged banknotes, decreases as the assembly diameter increases. The acceleration value $a_t$ is in particular inversely proportional to the total inertia of the moving elements of the storing and issuing device, seen by motor 60 of storage roller 50. Its reduced value, for large diameters of the assembly, is compensated by a controlled advance operation of the storing and issuing module 10, according to the method 1 above described. The invention method allows calculating a pattern for linear speed of transport tape 52 having lower accelerations values and lower speed values than prior art modules, that minimizes and keeps substantially constant the inertial torque seen by motor 60.

The preferred embodiments of this invention have been described and a number of variations have been suggested hereinbefore, but it should be understood that those skilled in the art can make other variations and changes without so departing from the scope of protection thereof, as defined by the attached claims.

For example, system 100 and method 1 of the invention can be implemented in devices other than receiving and dispensing ones. For example, they can be implemented only in receiving devices. Also, system 100 of the invention can comprise two or more storing and issuing modules, as represented, for example, in FIG. 2. In this case, through identification information ID, the central processing unit 19 can assign a sensed banknote to a specific storing and issuing module of the system and in this case, appropriate way of transporting the banknotes on conveyor belt 23 and diverting them to the corresponding storing and issuing module, will be comprised in the system and method.

Again, the system of the invention was not described as comprising sensors 66 as disclosed in the prior art, at conveying section 51 of each storing and issuing module 10. Those sensors 66, however, could indeed be provided in each or just some of the storing and issuing modules of the invention system 100. However, if they were included in the system, they would not be used as in the prior art, to activate motor 60. Instead, they could be used by processor 80 for activation of holding means 53-54, once an entering banknote B(m) is sensed by them (as depicted in FIGS. 8 to 11).

As a variation of the invention system 100, if sensor 66 were included in each or some storing and issuing module 10, then the resting position of a banknote could be such that $d_s$ corresponds to a length between opening 20 and somewhere between sensor 66 and the pinch-rollers 53-54. In FIG. 3 $d_s$ corresponds exactly to the distance of holding means 53-54 from opening 20.

As a final remark, it is to be noted that in the present description reference is made to a system 100 where the central processing unit 19 sends the sensing information to processor 80 of a storing and issuing module 10, after having checked the sensing information and established that the sensed banknote is not to be rejected. However, it the system 100 according to the invention had only one storing and issuing module 10 and did not implement any check of the sensing information, the sensing information provided by sensor group 9 could be sent directly to processor 80 for calculation of the pattern of the linear speed of transport tape 52 as disclosed above.

The invention claimed is:

1. A system for storing a series of flexible documents, wherein each flexible document of the series of flexible documents has a front and rear end, said system comprising
at least one storing and issuing module comprising:
an opening configured to receive each flexible document;
a storage roller configured to be actuated by a motor;
a transport tape configured to be moved via rotation of the storage roller;
a holding system configured for engaging each flexible document with the transport tape when the rear end of the flexible document has entered the storing and issuing module through the opening, the engagement occurring along a linear path of transport tape where transport tape can be moved at a speed before being rolled on the storage roller;
a processor;
a conveyor belt configured for supporting and transporting said flexible documents toward said at least one storing and issuing module at a conveying speed;
a sensor configured to sense any flexible document transported on said conveyor belt and provide corresponding sensing information,
wherein said system is configured to execute a method comprising, for an $m^{th}$ flexible document B(m) in a series ( . . . , B (m−1), B(m), B(m+1) . . . ):
sensing, through said sensor, sensing information regarding said flexible document B(m);
calculating a pattern of linear speed $v_{t(m)}(t)$ at which said transport tape is to be moved by said storage roller; and
sending, by said processor, control signals causing actuation of said holding system at a determined joint time instant $t_j(m)$ and, based on said pattern of linear speed $v_{t(m)}(t)$ of said transport tape, one or more respective control signal to said motor, causing control of said storage roller rotation, and a corresponding movement of said transport tape according to the calculated speed pattern $v_{t(m)}(t)$.

2. The system according to claim 1, further comprising more than one storing and issuing module and the central processing unit operatively connected to each processor of each storing and issuing module, the central processing unit being further configured to carry out a check of the sensing information and, based on the sensing information, select one of the storing and issuing module and send the sensing information thereto.

3. The system according to claim 1, wherein the method that the system executes further comprises:
providing within a prediction time instant $t_p(m)$ from sensing said sensing information to processor;
determining, through said processor:
based on said received sensing information and said known conveying speed $v_c(t)$ of conveyor belt, the determined joint time instant $t_j(m)$, wherein the rear end of said flexible document B(m) will have entered the storing and issuing module and said flexible document B m) will be engaged by said holding means with said transport tape,
based on a diameter of an assembly formed by said storage roller and said transport tape rolled together with any previously engaged flexible document (. . . , B(m−2), B(m−1)) around said storage roller, an acceleration value ($a_t$), and
based on said acceleration value ($a_t$), a deceleration value ($dec_t$), wherein the calculating the pattern of linear speed $v_{t(m)}(t)$ comprises
calculating the pattern of linear speed $V_{t(m)}(t)$ at which said transport tape is to be moved by said storage roller, after a prediction time instant $t_p(m)$ such that, at an estimated joint time instant $t_j(m)$ when said holding system engages said flexible document B(m) with transport tape in said at least one storing and issuing module, a predetermined desired distance $d_d$ on said transport tape is left between said front end of said flexible document B(m) and a rear end of a flexible document B(m−1) of the series, last engaged by said transport tape based on:
the sensing information;
said determined joint time instant ty (m), acceleration (at) and deceleration ($dec_t$) values; and
a linear speed profile $v_{t(m-1)}(t)$ determined by processor said for the previous flexible document B(m−1) of the series.

4. A method for storing a series of flexible documents, wherein each flexible document of the series of flexible documents has a front and rear end, said method comprising, for an $m^{th}$ flexible document B(m) in a series ( . . . , B(m−1), B(m), B(m+1), . . . ):

sensing, through a sensor configured to sense any flexible document transported on a conveyor belt and provide corresponding sensing information, sensing information regarding said flexible document B (m), wherein the conveyor belt is configured for supporting and transporting said flexible documents toward at least one storing and issuing module at a conveying speed, the at least one storing and issuing module comprising:

an opening configured to receive each flexible document;

a storage roller configured to be actuated by a motor;

a transport tape configured to be moved via rotation of the storage roller;

a holding system configured for engaging each flexible document with the transport tape when the rear end of the flexible document has entered the storing and issuing module through the opening, the engagement occurring along a linear path of transport tape where transport tape can be moved at a speed before being rolled on the storage roller; and a processor;

calculating a pattern of linear speed $V_{t(m)}(t)$ at which said transport tape is to be moved by said storage roller; and sending, by said processor, control signals causing actuation of said holding system at a determined joint time instant $t_j(m)$ and, based on said pattern of linear speed $v_{t(m)}(t)$ of said transport tape, one or more respective control signal to said motor, causing control of said storage roller rotation, and a corresponding movement of said transport tape according to the calculated speed pattern $v_{t(m)}(t)$.

5. The method according to claim 4, wherein more than one storing and issuing module and the central processing unit are operatively connected to each processor of each storing and issuing module, and wherein the method further comprises:

carrying out a check of the sensing information and based on the sensing information, selecting one of the storing and issuing module and send the sensing information thereto.

6. The method according to claim 4, further comprising:

providing within a prediction time instant $t_p(m)$ from sensing said sensing information to processor;

determining, through said processor:

based on said received sensing information and said known conveying speed $v_c(t)$ of conveyor belt, the determined joint time instant $t_j(m)$, wherein the rear end of said flexible document B(m) will have entered the storing and issuing module and said flexible document B(m) will be engaged by said holding means with said transport tape, based on a diameter of an assembly formed by said storage roller and said transport tape rolled together with any previously engaged flexible document (. . . , B(m−2), B(m−1)) around said storage roller, an acceleration value $(a_t)$, and based on said acceleration value $(a_t)$, a deceleration value $(dec_t)$, wherein the calculating the pattern of linear speed $v_{t(m)}(t)$ comprises calculating the pattern of linear speed $v_{t(m)}(t)$ at which said transport tape is to be moved by said storage roller, after a prediction time instant $t_p(m)$ such that, at an estimated joint time instant $t_j(m)$ when said holding system engages said flexible document B(m) with transport tape in said at least one storing and issuing module, a predetermined desired distance $d_d$ on said transport tape is left between said front end of said flexible document B(m) and a rear end of a flexible document B(m−1) of the series, last engaged by said transport tape based on:

the sensing information;

said determined joint time instant $t_j(m)$, acceleration $(a_t)$ and deceleration $(dec_t)$ values; and a linear speed profile $v_{t(m-1)}(t)$ determined by processor said for the previous flexible document B(m−1) of the series.

7. The method according to claim 4, wherein said acceleration value $(a_t)$ is inversely proportional to a total Inertia $(I_{tot60})$ required to rotate, through said motor, said assembly formed by said storage roller and said transport tape rolled together with any previously engaged flexible document ( . . . , B(m−2), B(m−1)) around said storage roller.

8. The method according to claim 7, wherein said total Inertia $(I_{tot60})$ is a function of said diameter value of said assembly formed by said storage roller and said transport tape rolled together with any previously engaged flexible document ( . . . , B(m−2), B(m−1)) around said storage roller, optionally wherein said acceleration value $(a_t)$ can be calculated in real-time or it can be calculated off-line and stored in said processor, optionally in a lookup table as a function of said diameter value.

9. The method according to claim 8, wherein said sensing information comprises at least the dimensions of a sensed $m^{th}$ flexible document B(m) of the series of flexible documents and its angular position (a) with reference to an axis parallel to a longitudinal symmetry axis of conveyor belt, and optionally the distance (Y) of each flexible document from a lateral edge of conveyor belt, and/or a denomination (ID) of said sensed $m^{th}$ flexible document B(m), more optionally a length of the projection (Proj(m)) of the sensed $m^{th}$ flexible document B(m) along an axis parallel to the longitudinal symmetry axis of conveyor belt.

10. The method according to claim 4, wherein if the $m^{th}$ flexible document B(m) is the very first one of the series of flexible documents or if it is not the first one and prediction time instant to $t_p(m)t \geq (t_j(m-1)+\Delta t_{stop})$, where:

$t_j(m-1)$ is the joint time instant of the last engaged flexible document B(m−1) of the series, and $\Delta t_{stop}$ is a known time interval required to take a flexible document to a resting or stop position on transport tape with its rear end at a stop distance $d_s$ from opening, then said pattern of linear speed $v_{t(m)}(t)$ of transport tape is calculated, so that, between $t_p(m)$ and $t_j(m)$, it satisfies rule:

$$\int_{t_p(m)}^{t_j(m)} v_{t(m)}(t)dt = \text{Proj}(m)+d_d-d_s \quad (1)$$

where Proj(m) is the length of the projection of the sensed flexible document B(m) along an axis parallel to the longitudinal symmetry axis of conveyor belt, and after $t_j(m)$, it satisfies rule:

$$\int_{t_j(m)}^{t_j(m)+\Delta t_{stop}} v_{t(m)}(t)dt = d_s \quad (2).$$

11. The method according to claim 4, wherein if prediction time instant for said flexible document B(m) is such that $t_p(m) \leq t_j(m-1)$, where $t_j(m-1)$ is the joint time instant of the last sensed flexible document B(m−1) of the series, then said pattern of linear speed $v_{t(m)}(t)$ of transport tape is calculated that, between $t_j(m-1)$ and $t_j(m)$, it satisfies rule:

$$\int_{t_j(m-1)}^{tj(m)} v_{t(m)}(t)dt = \text{Proj}(m) + d_d \quad (3)$$

where Proj (m) is the length of the projection of the sensed flexible document B(m) along an axis parallel to the longitudinal symmetry axis of conveyor belt, and after $t_j(m)$, the pattern of linear speed $v_{t(m)}(t)$ is set by processor to satisfy rule:

$$\int_{t_j(m)}^{tj(m)+\Delta t_{stop}} v_{t(m)}(t)dt = d_s \quad (2)$$

where $\Delta t_{stop}$ is a known time interval required to take a flexible document B(m) to a resting or stop position on transport tape with its rear end at a stop distance $d_s$ from opening.

12. The method according to claim 4, wherein if prediction time instant for said flexible document B(m) is such that $t_j(m-1) < t_p(m) \le (t_j(m-1) + \Delta t_{stop}) - t_{rate}$, where:

$t_j(m-1)$ is the joint time instant of the last engaged flexible document B(m−1) of the series, $\Delta t_{stop}$ is a known time interval required to take said flexible document B(m) to a resting or stop position on transport tape with its rear end at a stop distance $d_s$ from opening and $t_{rate}$ is a constant nominal time interval of said flexile document B(m), then linear speed $v_{t(m)}(t)$ of transport tape is calculated that, between $t_j(m-1)$ and $t_j(m)$, satisfies rule $$\int_{t_j(m-1)}^{tp(m)} v_{t(m-1)}(t)dt + \int_{t_p(m)}^{tj(m)} v_{t(m)}(t)dt = \text{Proj}(m) + d_d \quad (4)$$

where Proj(m) is the length of the projection of the sensed flexible document B (m) along an axis parallel to the longitudinal symmetry axis of conveyor belt, and after $t_j(m)$, it satisfies rule:

$$\int_{t_j(m)}^{tj(m)+\Delta t_{stop}} v_{t(m)}(t)dt = d_s \quad (2).$$

13. The method according to claim 4, wherein if prediction time instant for said flexible document B(m) is such that $(t_j(m-1) + \Delta t_{stop}) - t_{rate} < t_p(m) < (t_j(m-1) + \Delta t_{stop})$ Where:

$t_j(m-1)$ is the joint time instant of the last engaged flexible document B(m−1) of the series, $\Delta t_{stop}$ is a known time interval required to take a flexible document to a resting or stop position on transport tape with its rear end at a stop distance de from opening and $t_{rate}$ is a constant nominal time interval of said flexile document B(m), then the linear speed $v_{t(m)}(t)$ of transport tape is calculated that, after stop of last engaged banknote B(m−1), it satisfies rule:

$$\int_{t_j(m-1)+\Delta t_{stop}}^{tj(m)} v_{t(m)}(t)dt = \text{Proj}(m) d_d - d_s \quad (5)$$

where Proj(m) is the length of the projection of the sensed flexible document B(m) along an axis parallel to the longitudinal symmetry axis of conveyor belt (23), and after $t_j(m)$, it satisfies rule:

$$\int_{t_j(m)}^{tj(m)+\Delta t_{stop}} v_{t(m)}(t)dt = d_s \quad (2).$$

14. The method according to claim 13, wherein said stop distance ds is comprised between 70% and 100% of the height H of the smallest flexible document to be stored in said at least one storing and issuing module.

15. The method according to claim 4, wherein said linear speed $v_{t(m)}(t)$ of transport tape has a pattern over time defining a line segment or chain of line segments.

16. The method according to claim 15, wherein said line segment or chain of line segments is associated to:

said acceleration value ($a_t$);

a constant speed target value ($v_t$); and said deceleration value ($dec_t$).

17. The method according to claim 16, wherein said constant speed target value ($v_t$) is a function of:

two following joint time instants ($t_j(m-1)$ and $t_j(m)$) determined by processor, the distance, calculated by processor that the rear end of a previous sensed flexible document B(m−1) needs to cover with transport tape in order to allow the entering flexible document B(m), when also engaged by transport tape, to have its front end at distance da from rear end of last engaged flexible document B(m−1), the acceleration value ($a_t$), the value of linear speed $v_{t(m-1)}t_j(m)$) of the last sensed flexible document B(m−1) that transport tape would have at joint time instant $t_j(m)$, if the flexible document B(m) had not been sensed by sensor group.

* * * * *